United States Patent [19]

Wight et al.

[11] Patent Number: 4,613,436
[45] Date of Patent: Sep. 23, 1986

[54] MEMBRANE ASSEMBLY FOR FLUID SEPARATIONS-DISK

[75] Inventors: William W. Wight, Alta Loma; Richard A. Becker, San Gabriel, both of Calif.

[73] Assignee: Separex Corporation, Anaheim, Calif.

[21] Appl. No.: 666,830

[22] Filed: Oct. 31, 1984

[51] Int. Cl.⁴ .............................................. B01D 31/00
[52] U.S. Cl. ................................ 210/232; 210/321.1; 210/433.2
[58] Field of Search ...................... 210/232, 321.1, 336, 210/346, 433.2, 347, 438, 439, 441, 461, 456; 55/484

[56] References Cited

U.S. PATENT DOCUMENTS 4,202,772  5/1980  Goldstein ........................ 210/321.1
4,243,536  1/1981  Prolss ................................... 55/484

Primary Examiner—Frank Sever
Attorney, Agent, or Firm—Joseph E. Mueth

[57] ABSTRACT

A membrane assembly for fluid separations consisting of a compact stack of alternating layers of membrane with layers of fluid conducting materials. The assembly consists of a simplified and improved plate and frame apparatus. The stacked assembly may be placed into a pressure containment device consisting of standard pipe with standard methods of closure. Internal fluid conducting passages are formed from cutouts in the stacked layers thereby greatly simplifying the manufacture and assembly of large diameter fluid separation devices using membranes to effect the fluid separations. The fluid pathways are such that the membrane assembly is particularly efficient in separation.

22 Claims, 33 Drawing Figures

FIG. 12
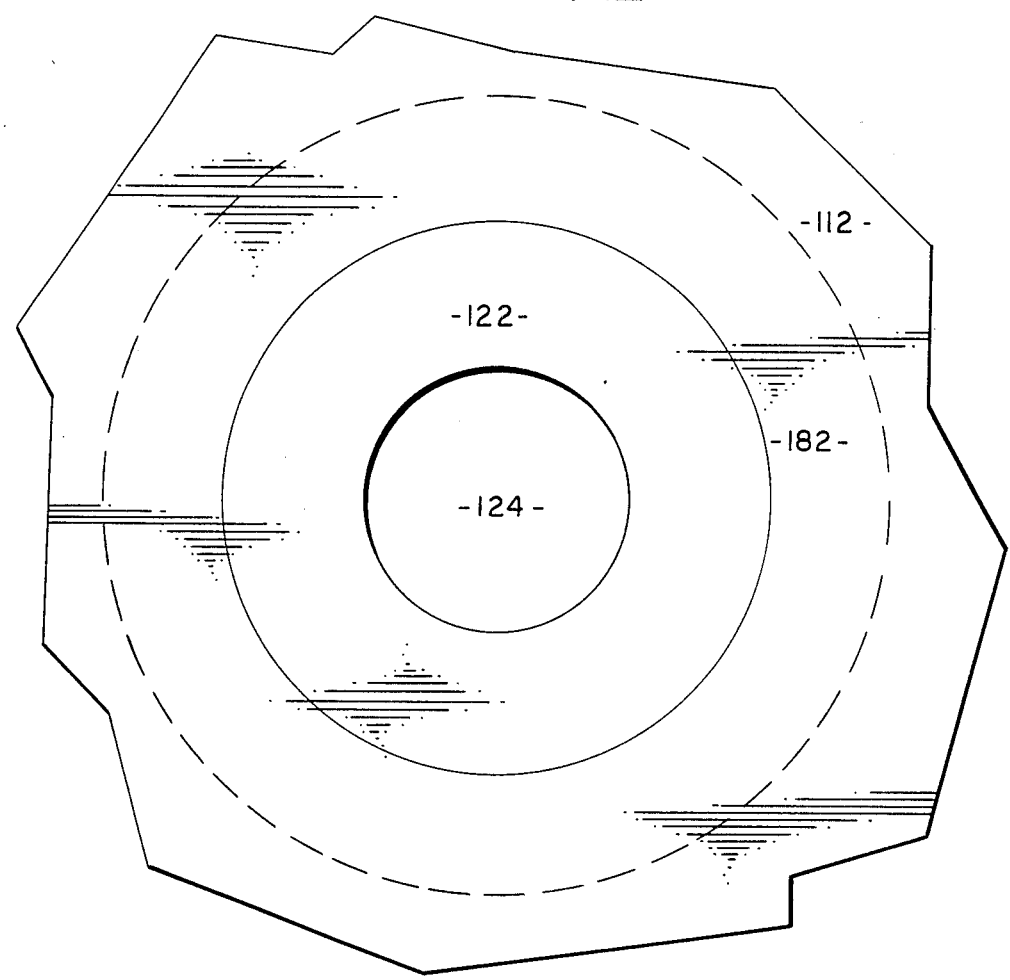
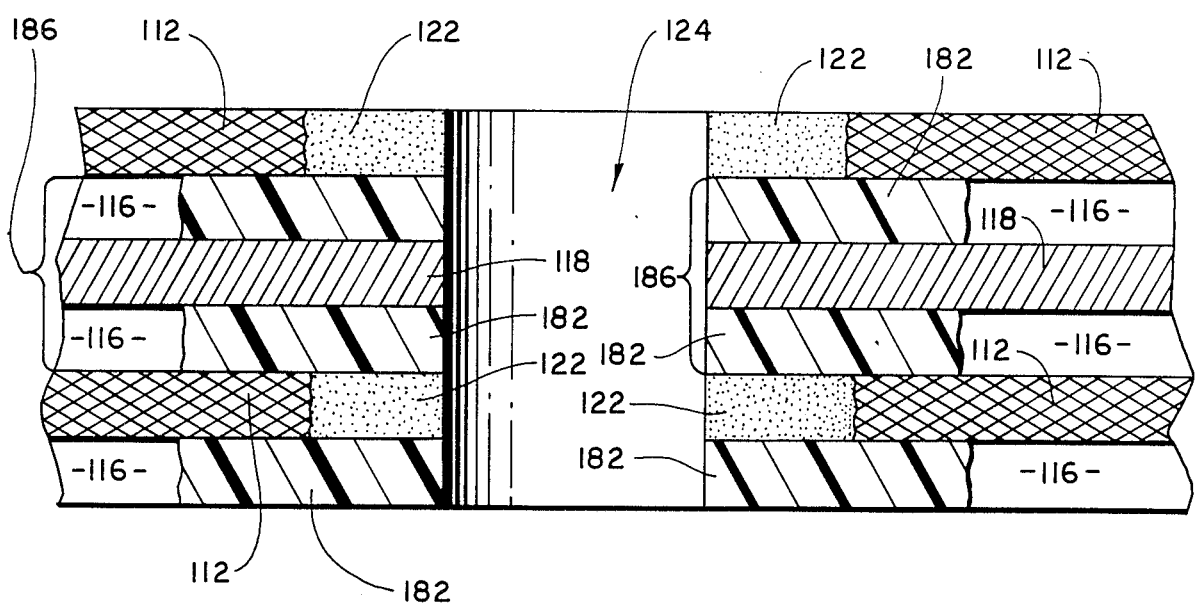
FIG. 13

MEMBRANE ASSEMBLY FOR FLUID SEPARATIONS-DISK

BACKGROUND OF THE INVENTION

The present invention relates to a fluid separation apparatus utilizing a membrane to effect the separation. The fluid separation may be a (1) separation of gaseous mixtures by permselective gaseous diffusion; (2) separation of dissolved solids from liquids by reverse osmosis; (3) separation or concentration of liquids from mixtures of liquids and dissolved solids by direct osmosis; (4) separation or concentration of liquids and solids by dialysis; (5) separation of liquids from mixtures of liquids by reverse osmosis or ultrafiltration; (6) the separation of solids from liquids by ultrafiltration; (7) gaseous exchange between liquids; and (8) exchange between a gas phase and a liquid phase. This invention particularly relates to a stacked assembly of membrane and spacer layers in a simplified and commercially advantageous plate and frame arrangement and to the method of manufacturing such an apparatus.

Fluid separations utilizing membranes offer many advantages over conventional separation techniques. In the field of water desalination, reverse osmosis membrane processes are now dominating this field, reducing the reliance on ion exchange, distillation and electrodialysis. In gas separation, membrane processes are being accepted as a new method to remove components from a gaseous mixture, such as the removal and recovery of hydrogen from process gas streams and the removal of carbon dioxide from natural gas. Ultrafiltration membrane processes are becoming very important in water treatment, pharmaceuticals processing, food processing, wastewater cleanup, and materials recovery from fluids.

The various types of fluid separations discussed above are not of a simple filtration type, but involve the feed fluid being contacted onto one side of the membrane and one or more components of the feed fluid passing through the membrane leaving the feed fluid depleted in those components. The feed fluid continually sweeps the surface of the membrane, carrying away the nonpermeating components in the feed fluid. After the feed fluid has contacted the membrane it becomes the residue or concentrate. The residue fluid may be the important component of the system or it may be a waste component.

There are many types of membranes in commercial use and many more in development throughout the world. One thing that all membranes share, regardless of their application, is that they must be supported and housed in a suitable package. If a membrane is to effect its intended purpose, that is to separate some component from a mixture, the membrane package apparatus must:

1. Support the membrane against the static and dynamic pressures and forces applied to one side of the membrane.
2. Provide a passage to the membrane for the feed fluid.
3. Provide for the removal of the fluid that permeated the membrane.
4. Prevent the contamination or mixing of the feed fluid and the fluid permeating through the membrane.
5. Provide a passage for the residual fluid after it has contacted the membrane.
6. Provide a safe housing to contain the fluids being separated.
7. Be economical to manufacture.

The method of assembling the membrane into the package must be efficient to allow the greatest amount of membrane inside the package as possible. The assembled package should also be compact utilizing the least amount of space practical.

As membranes were developed, methods to package them were required for the membranes to function. The first membrane packages were of the plate and frame type, borrowed and modified from the filtration industry, U.S. Pat. Nos. 3,473,668 and 3,209,915. These devices consisted of top and bottom plates with supporting frames and plates in between, U.S. Pat. No. 2,597,907. Feed fluid is introduced through the top plate and passes down to the feed fluid spacers by way of a manifold on one side of the plate and frame assembly. The component of the feed fluid that permeates the membrane enters a permeate carrier layer and is carried out of this layer to the permeate manifold. Complicated porting was required to route the feed fluid through the plate and frame stack to achieve the required recovery rates and to remove the permeate fluid from the stack. The feed fluid depleted in the more permeable component becomes the concentrate or residue and is removed from the assembly via the concentrate manifold. The plate and frame assembly must be constructed of materials that are strong enough to contain the feed fluid under pressure. The early plate and frame assemblies were square or rectangular in shape.

The early attempts to commercialize reverse osmosis and gas separation membranes utilized the plate and frame type of assembly. The process of using membrane for these applications was demonstrated but the economics of the systems were very poor. This was due, not to poor performance of the membrane but, to the very high cost and low packing density of the plate and frame assemblies. Since it was not economical to utilize membrane for either reverse osmosis or gas separation processes with the plate and frame type of membrane assembly, other packaging techniques were investigated and developed.

In 1970 the first commercial high pressure membrane system was installed. This reverse osmosis system utilized cellulose acetate membranes packaged in a spiral wound element configuration, such as is disclosed in U.S. Pat. No. 3,417,870. Flat sheet membranes packaged into spiral wound elements were then joined on the commercial scene by membranes fabricated into hollow fine fiber bundles and into tubular assemblies. Many high pressure industrial uses of synthetic membranes have been commercialized since 1970 utilizing these three main types of membrane packages.

Plate and frame membrane assemblies have been improved during the past 25 years but the devices as currently manufactured are not competitive with membrane packages using hollow fine fibers or spiral wound elements. This is because the plate and frame type of membrane packages are very complicated and therefore expensive to manufacture. The separation devices of Iaconelli U.S. Pat. No. 3,695,444 and Olsen U.S. Pat. No. 3,623,610 are typical of early plate and frame assemblies. Typical of current art is the separation cell of Kraus U.S. Pat. No. 4,340,475. In this device complicated support, separator, collector and distribution plates are required. The membrane supporting plate for example is formed from many pieces and requires a complicated manufacturing process to produce. The separator plates are likewise complicated. The plates are not only expensive to manufacture they are also thick, on the order of 0.1 to 0.25 inches. Thick plates of this type are unable to compete with the hollow fine fibers or spiral wound elements because of their very low membrane packing densities. In U.S. Pat. No. 4,255,263, Galami describes another variation of a stacked separation device. This device also has complicated plates, requiring many parts and materials. In this device the plates are also thick leading to low packing density. In U.S. Pat. No. 4,310,416 Tanaka describes another plate type membrane device. Again, the plates are very complicated and the assembly complex, with many seals and ports that must be connected between the various plates. This device also has thick plates, again leading to low membrane packing density.

In U.S. Pat. No. 4,243,536 Prolss describes a stacked assembly of disk-shaped elements which are located concentrically around a permeate collection pipe and within a pressure vessel. Membrane layers are placed on both sides of a membrane support and permeate carrier layer. This permeate layer is molded from plastic and contains raised squares and fluid conduction passages. This layer is rather thick being about 0.25 inches, and conveys the permeate to the centrally located collection pipe. The centrally located pipe contains ports or holes that are precisely located in the center of the permeate collection layer. Located above and below the permeate carrier-membrane assembly is the feed space which is also thick being about 0.25 inches. The feed fluid enters a pipe located next to and off center from the permeate pipe. Ports or holes are located in the feed fluid pipe that distribute the feed fluid into the feed fluid space. The feed fluid spacer layers must be precisely located to match up with the ports in the feed fluid distribution pipe. At the edge of the disk is a cut-out that contains the residual fluid collection pipe. This collection pipe also contains precisely located holes or parts that must match up with the feed fluid space. The assembly is stacked on the centrally located permeate pipe and placed in a pressure vessel. The present invention improves over the art of Prolss in several ways: first there are no internal pipes; feed fluid, residual fluid, and permeate fluid are conducted within the stacked assembly through channels formed by the registration of the notches cut into the layers of material that make up the stacked assembly. Second, the membrane packing density is much greater than the device of Prolss; the spacer layers are much thinner resulting in much higher packing density. Third, the device is much more economical to manufacture than the device of Prolss; the layers are made from inexpensive matted, knitted or woven materials rather than the injection molded materials of Prolss. Fourth, the assembly of the present stacked assembly is significantly easier than assembling the device of Prolss; there are no internal pipes with precisely drilled holes that the various layers must be aligned to. Fifth, the permeate carrier of the present invention acts as both a membrane support layer and a permeate carrier. This layer can be a paper or paperlike material, a woven material or a knitted material. All of these types of materials can be made to both support the membrane and conduct the permeate to the central permeate collection channel. In the stacked assembly of Prolss, the membrane support and permeate conduction layer are molded from a plastic. The layer has flat, smooth landings that support the membrane and trough-shaped conducting channels molded between the landings. This approach is both uneconomical and inefficient when compared to the present invention.

Conventional fluid separation processes (such as distillation, cryogenic fractionation and physical and chemical solvent extraction) have one advantage over the newer membrane based processes, this being that large scale projects can benefit from economies of scale. World scale size separation plants can use larger vessels, columns and piping, thereby taking advantage of the economies of scale. Membrane based processes, however, have not been able to take advantage of economies of scale because the present membrane packaging techniques are very limited in upward growth in size.

The present spiral wound membrane package is limited to about 12 inches in diameter and 60 inches long, containing approximately 1300 square feet of membrane. A spiral wound membrane element must be constructed of multiple leaves of membrane, permeate carrier and feed fluid spacer layers. A spiral wound membrane element with a diameter of 4 inches and a length of 40 inches has 3 or 4 leaves, each containing 16 to 25 square feet of active membrane area. The leaf length is limited because the efficiency of the permeate carrier material is poor. A leaf length of more than 40 to 60 inches causes a back pressure in the leaf that is too high to be acceptable. An increase in diameter greatly increases the number of individual membrane leaves required in each spiral wound element. A 12 inch diameter spiral wound element contains between 24 and 30 individual leaves. Making spiral elements with larger diameters, such as 16 inches results in almost insurmountable manufacturing problems. There is so much membrane in each element and so many individual membrane leaves to handle that the statistical chance of a defect in each spiral element is very high.

One of the major improvements of the instant invention over previous art is that the path the permeate is required to travel is greatly reduced. In a membrane package of the instant invention made 60 inches in diameter the permeate has only to travel a maximum of 30 inches to reach the central collection channel.

For hollow fine fiber bundle elements the same problem exists. The current hollow fiber elements are 8 to 10 inches in diameter. Increasing the diameter to 12 to 16 inches increases the complexity of manufacture and the likelihood of a defect is very high. The hollow fine fiber bundles are limited in length due to the pressure drop of the permeate in the bore of the fiber. Current designs of hollow fiber bundles are limited to about 12 feet in length.

Even if it were practical to manufacture spiral wound and hollow fiber elements in 16 inch diameters it is not a significant increase in the economies of scale over existing element sizes. To be able to compete in world class projects with conventional technologies, membrane packages and pressure vessels to contain the packages must be increased to the order of 36 to 60 inch diameters.

One of the advantages of the present invention is that it provides a method and apparatus to package membranes for these very large systems. It is just as feasible to an facture this new membrane package in 36 to 60 inch diameters as it is in 8 to 12 inch diameters. A major advantage of the present invention is that each membrane-permeate carrier assembly can be pretested for defects before it is assembled into the pressure vessel or module. This means that only a few square feet of membrane is lost due to a defect in the membrane or adhesive sealant lines.

Concurrent with the development of the high pressure industrial membrane applications was the development of small and low pressure membrane packages. Examples of these packages are artificial kidneys, home and laboratory reverse osmosis systems, food and beverage processing elements and many special membrane packages. These systems utilized spiral wound elements, hollow fiber bundles and tubular elements but also led to the development of many variations of the original plate and and frame package.

The present invention is applicable to these very small membrane packages including small medical units. In this regard, the present invention is particularly adaptable to portable blood oxygenators and similar devices. The high density of the packing in the present invention makes possible devices which are both efficient and compact.

In general, the present invention provides a novel membrane device which is simple and less costly to fabricate, physically compact, and highly efficient in operation. Accordingly, it is to be expected that our invention will be widely adoped in the art.

SUMMARY OF THE INVENTION

Briefly, the present invention pertains to a device for the separation of two or more different materials comprising:

a pressure vessel adapted to contain fluids under pressure, means for admitting feed fluid to be separated to said vessel, means for removing residue from said vessel, means for removing permeate from said vessel, at least one compact stacked assembly within said vessel comprising a plurality of elements disposed in superposed relationship, said elements including separator membranes, distribution zones for providing lateral flow of feed fluid to be separated across the active faces of said membranes, and permeate carrier elements abutting the opposed faces of the membranes to carry away permeate, said elements in said stacked assembly having registered edge notches at two spaced-apart points one of said registered edge notches forming a feed channel for feed fluid to be separated and the other of said registered edge notches forming a residue collection channel, said distribution zone being in fluid communication with said feed and residue collection channels at said registered notches, said elements also havng registered internal apertures forming a permeate collection channel which is in fluid communication with said permeate carrier elements, said stacked assembly being disposed between said means for admitting and said means for removing.

It is an object of this invention to provide a novel separation means.

More particularly, it is an object of this invention to provide novel separation means which is easier and more economical to manufacture.

More specifically, it is an important object of our invention to provide a novel fluid separation device having a plurality of stacked elements wherein the feed and residue channels are formed by registered edge notches and the permeate is collected in an internal channel formed by registration of internal apertures.

These and other objects and advantages of our invention will be apparent from the more detailed description which follows taken in conjunction with the accompanying drawings.

A. MEMBRANE

Membrane is the term used to identify the material that does the separation. This membrane may be of a porous nature or it may be of a non-porous nature. Membranes of a porous nature can be ultrafiltration membranes. These membranes are generally characterized as having pores of a defined and uniform size. An ultrafiltration membrane removes a component or components from the feed fluid on the basis of the size of the components to be removed.

Non-porous membranes are characterized as having no pores or having pores much smallar than the component that is to be removed. Reverse osmosis, dialysis and gas diffusion membranes are charactarized as being non-porous. Membranes are generally regarded as having an active side or front side that is contacted with the feed fluid and a back side that faces away from the feed fluid.

Membranes may be fabricated from many materials, from inorganic compounds to the newest polymeric materials. The composition of the membranes does not form a part of this invention which is applicable of porous and non-porous membranes generally. The structure of membranes are characterized as being uniform throughout or of being anisotropic in cross section. Membranes can be made of one material, mixtures or blends of materials or composites of two or more materials.

B. PERMEATE CARRIER MATERIAL

Permeate is a term used to identify that portion of the feed fluid that permeates or crosses through the membrane. Permeate carrier material is a material that receives the permeate from the back side of the membrane and transports the permeate out of the membrane assembly. The permeate carrier material may do this job on its own or it may be joined into some other device or material to complete the removal of the permeate from the membrane assembly. This other material or device may be a permeate tube, a pipe, a port, a channel, a duct, a hose or the like. The permeate carrier material must also support the membrane against the hydrostatic pressure exerted on the feed fluid and hence the membrane. This force will try to crush or flatten the permeate carrier material. The permeate carrier material must be selected and engineered to withstand these crushing forces to be effective in transporting the permeate to its desired location.

The permeate carrier material may be of many different types of materials and designs. The simplest would be a layer of paper or fabric direrting the permeate to the desired location, and a complicated permeate spacer material would be injection molded from plastic with many intricate passages and ports. A permeate carrier material that can be used advantageously in the instant invention consists of a knitted fabric of a tricot or Simplex design of polyester or nylon yarns. The fabric is subsequently coated with a suitable resin to impart stiffness and resistance to crushing to the fabric.

C. FEED FLUID SPACER

The feed fluid spacer is a layer that provides for the passage of the feed fluid over the active side of the membrane. The feed fluid spacer may serve the function of directing the feed fluid to cover the active side of the membrane in a uniform manner, reducing stagnant areas as much as possible. The spacer may also impart turbulance to the feed fluid to provide good mixing in the feed fluid as it travels over the active side of the membrane and the more permeable component of the feed fluid is removed. The feed fluid spacer may be a material that is woven, molded, formed, extruded, knitted, cast or formed in place. The feed spacer layer may consist of no material at all, just a space formed by a separation of the layers of the membrane.

D. PRESSURE VESSEL ASSEMBLY

The term pressure vessel assembly is used to identify the housing that the membrane assembly is inserted into. The pressure vessel assembly contains the feed fluid under pressure. The pressure of the feed fluid may be as high as several thousand psig and as low as atmospheric. The pressure vessel assembly may also be subjected to a vacuum in some methods of operation. The pressure vessel must also safely contain the pressurized feed fluid. The vessel must also contain the feed fluid from contacting the outside world as many feed fluids processed with membranes are toxic or corrosive or flammable.

It should be noted that the stacked assembly of the present invention represents a significant advance in the art in that it is the first such device to use the same materials of construction as are used in the spiral wound membrane elements. No known art of a plate and frame type of membrane assembly has been able to use these inexpensive and very efficient materials of construction. This fact makes it possible for a stacked assembly of the present invention configured in a 12 inch diameter to have the same membrane packing density as a 12 inch spiral wound element.

BRIEF DESCRIPTION OF THE DRAWINGS

One preferred embodiment of the present invention is shown in FIGS. 1, 2, 3, 4, 5, 6, 7, 8, 9, 10, 11, 12, 13, 14, 15, 16, 17, and 18.

FIG. 12 is a plan view of the back or porous side of a cellulose membrane layer.

FIG. 13 is a cross-section of the central aperture similar to the view in FIG. 11.

DESCRIPTION OF THE PREFERRED EMBODIMENTS

Figure 1:
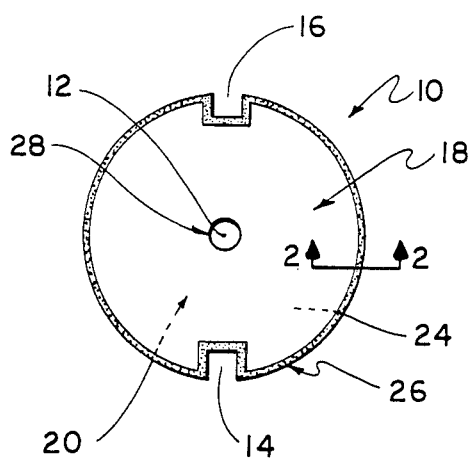
FIG. 1 is a plan view of a membrane-permeate carrier assembly.

Referring to FIG. 1, a membrane-permeate carrier assembly is shown in plan section. The assembly is of a circular shape of a given diameter. The assembly consists of a permeate carrier material 10 cut into a circular shape with a central aperture 12 and with two opposed notches 14 and 16 cut out of the perimeter of a given size and shape. Two layers 18 and 20 of membrane are identical in shape to the permeate carrier material 10. The membrane layers 18 and 20 are placed in contact with the permeate carrier material 10 with the active sides 22 and 24 of the membranes 18 and 20 facing away from the permeate carrier material 10. The notches in the three layers, viz, the two membrane and the permeate carrier layer are in registration. Adhesive line 26 is placed between the membrane layers 18 and 20 and the permeate carrier material 10 around the perimeter of the assembly. Adhesive is absent from the perimeter of the central aperture 12 in area 28 leaving the permeate carrier material able to communicate with the central aperture 12.

Figure 2:
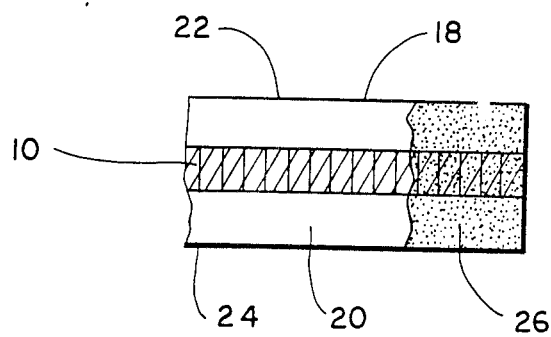
FIG. 2 is an enlargement of a cross-section of the edge of the membrane-permeate carrier assembly taken along the line 2—2 in FIG. 1.

FIG. 2 shows in cross-section the edge or periphery of the membrane-permeate carrier assembly. Adhesive line 26 saturates the permeate carrier material 10 and membranes 18 and 20 forming a peripheral seal between these three layers. Membrane active sides 22 and 24 are shown.

Figure 3:
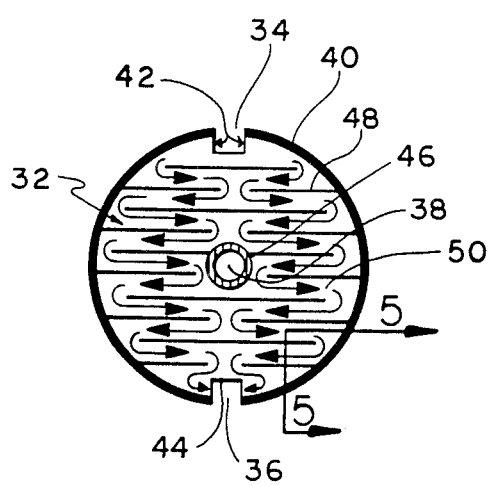
FIG. 3 is a plan view of a feed fluid spacer layer.

FIG. 3 is a plan view of a feed fluid spacer layer assembly. This assembly is identical in shape to the membrane-permeate carrier assembly shown in FIGS. 1 and 2. The feed spacer 32 has two opposed notches 34 and 36 and a central aperture 38. Around the perimeter is placed a sealing bead or ring 40, this sealing ring being absent from the edges of the notches 34 and 36 in area 42 and 44, respectively. A sealing ring or boss 46 is formed around central aperture 38. Feed fluid distribution lines 48 are formed in the feed spacer material to direct the feed fluid across the feed fluid spacer layer in such a manner as to minimize stagnant areas. Feed fluid enters the layer at notch 34 at point 42 and passes through the spaces 50 formed between the feed fluid distribution lines 48 and exits the layer at point 44 in notch 36. It must be noted that many different configurations of feed fluid distribution lines may be employed. It is desirable to adapt the feed fluid distribution pattern to the feed fluid being utilized. Such modification takes into effect feed fluid composition, viscosity, velocity, temperature and any other factors that are important.

Figure 4:
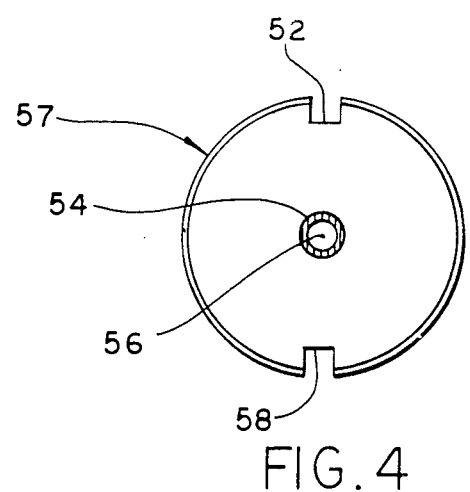
FIG. 4 is an alternative feed fluid spacer layer to the one shown in FIG. 3.

FIG. 4 is a plan view of an alternate to the feed fluid spacer layer shown in FIG. 3. This alternate is suitable for fluid separations where accurate feed fluid direction and mixing are not required, as in the separation of gases. This alternate form of the feed fluid spacer layer contains no feed fluid distribution lines, and may in fact consist of a space between the two adjacent layers of membrane. Feed fluid enters notch 52 and flows past the surface of the membrane, around sealing boss 54 at central aperture 56 and exits the layer at 58. Around the perimeter is placed sealing bead or ring 57.

Figure 5:
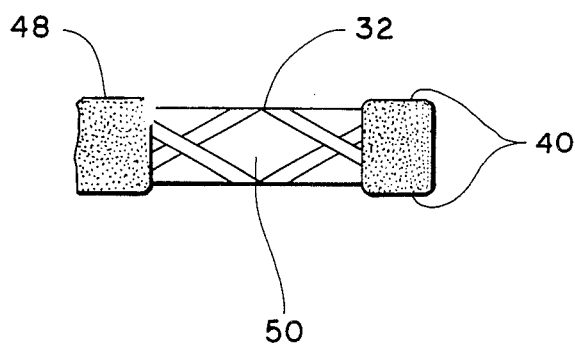
FIG. 5 is a cross section of the edge of the feed fluid spacer layer taken along the line 5—5 in FIG. 3.

FIG. 5 is a cross-section of the feed fluid spacer assembly of FIG. 3 showing the feed fluid spacer material 32, the perimeter sealing ring 40, the feed fluid distribution lines 48 and the feed fluid space 50. In operation feed fluid enters notch 34 of FIG. 3 and travels through the feed fluid spacer material being directed by distribution lines 50 to notch 36. The feed fluid is directed around central aperture 38. Feed fluid is prevented from bypassing feed fluid spacer by perimeter sealing bead or ring 40.

Figure 6:
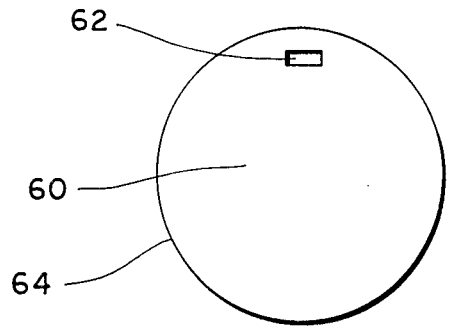
FIG. 6 is a plan view of the inlet distributor plate.

FIG. 6 is a plan view of the feed fluid inlet distribution plate 60 showing an inlet port 62 and a perimeter seal 64. The shape of the plate is circular and the same diameter as the membrane-permeate assembly.

Figure 7:
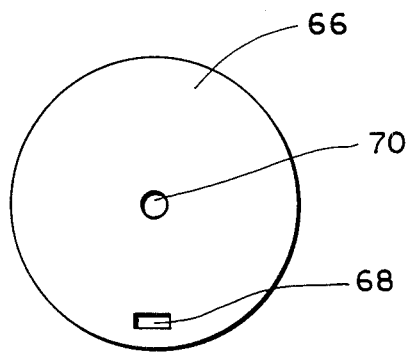
FIG. 7 is a plan view of a midsection and residual distributor plate.

FIG. 7 is a plan view of a midsection and residue distribution plate 66 showing port 68 and central aperture 70. The shape is circular and the diameter is identical to the membrane-permeate carrier assembly. The central aperture is the same diameter as the central aperture in the membrane-permeate carrier assembly.

Figure 8:
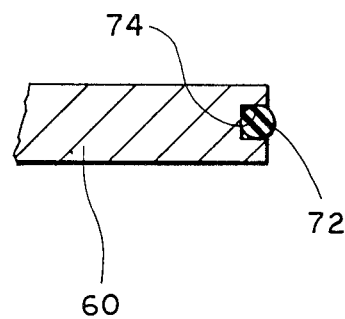
FIG. 8 is a cross section of the edge of the inlet and midsection and residual distributor plates.

FIG. 8 is an enlargement of the plates 60 and 66 shown in FIGS. 6 and 7 identifying the plate 60 (or 66) and perimeter seal 72 in groove 74. It must be noted that plate 60 may be of almost any thickness and that alternate means may be employed to affect a seal at the perimeter.

Figure 9:
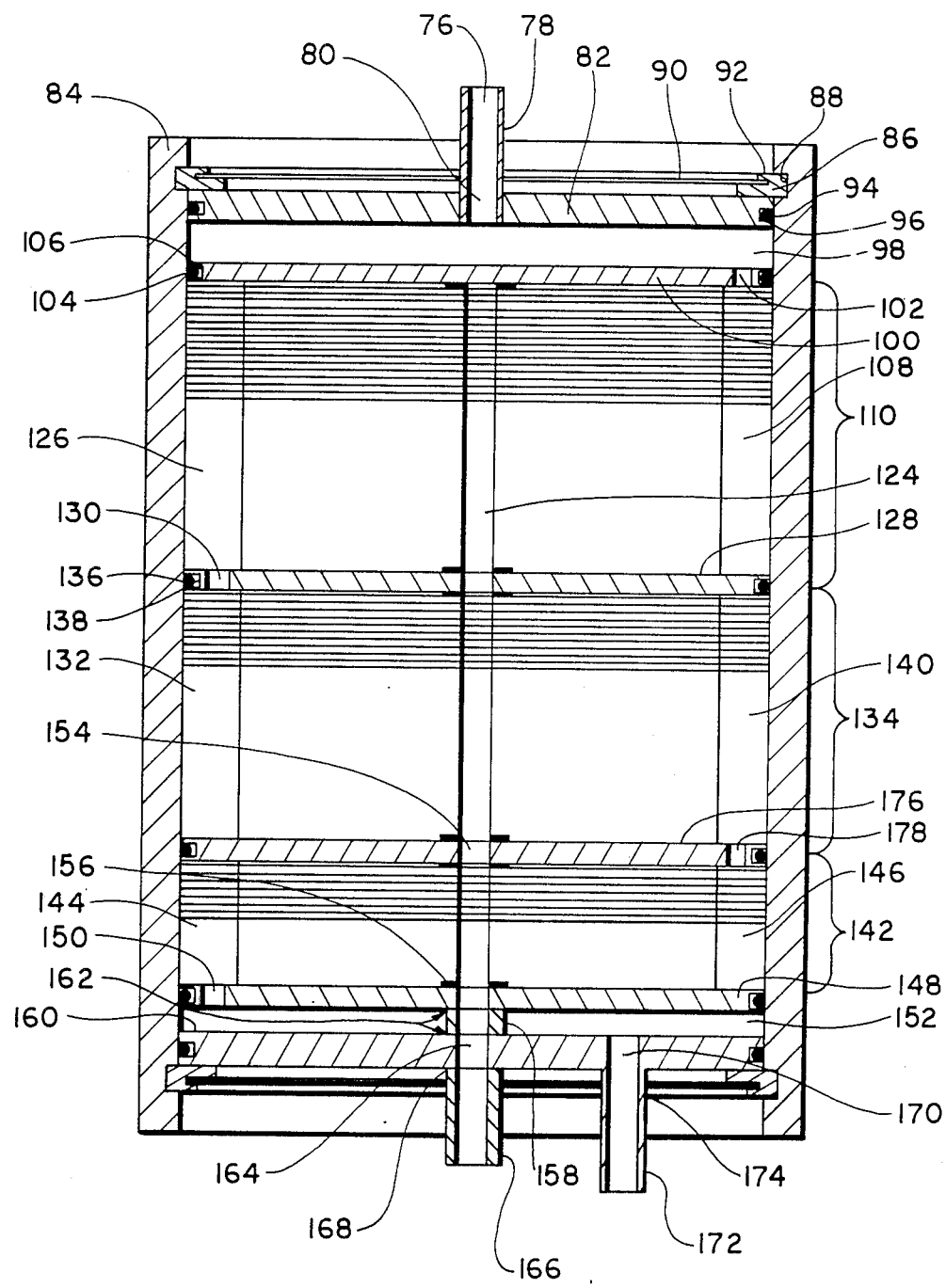
FIG. 9 is a cross section of the stacked assembly of the membrane, permeate carrier and feed fluid spacer within a pressure housing.
Figure 10:
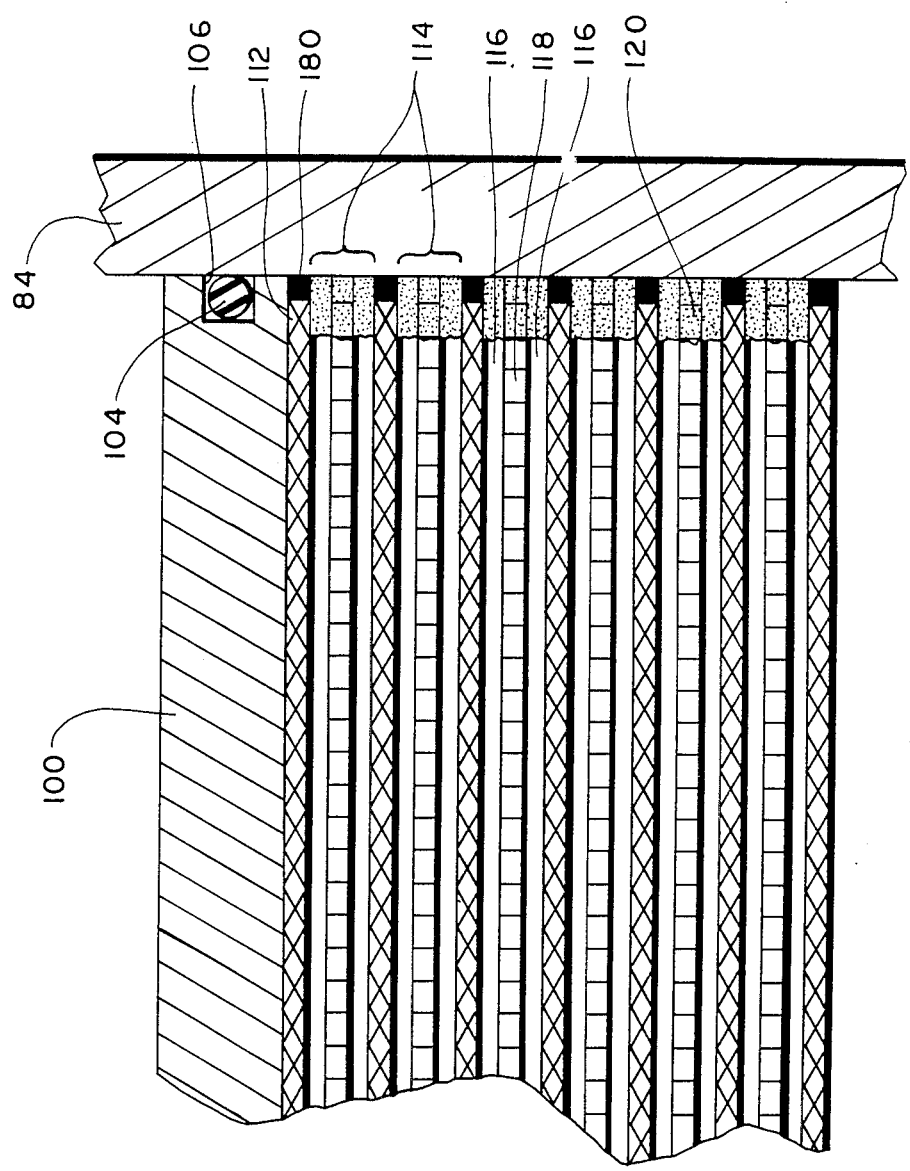
FIG. 10 is an enlargement of the stacked assembly in cross section, showing in detail the arrangement of the various layers of materials at the outside perimeter of the assembly.
Figure 11:
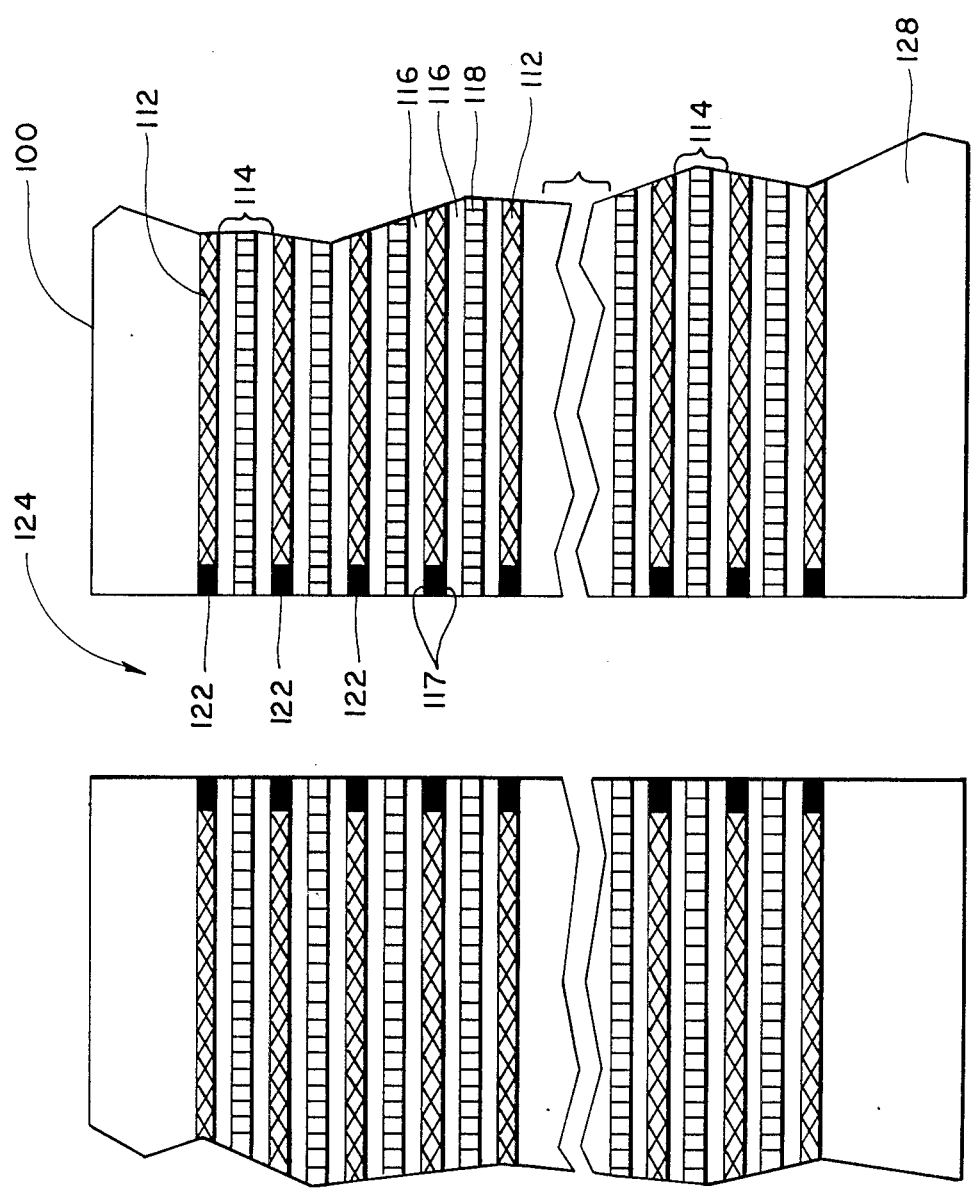
FIG. 11 is an enlargement of the stacked assembly in cross section showing in detail the arrangement of the various layers of materials at the center of the assembly.

Referring to FIGS. 9, 10 and 11, the stacked assembly is described as follows: feed port 76 consists of pipe 78 which is attached to and communicates through port 80 in bulkhead 82 which contains the feed fluid pressure within vessel 84. Bulkhead 82 is held in place by segmented ring 86 which is placed in groove 88 of pressure vessel wall 84. The segmented ring 86 is held in place by a snap ring or retaining ring 90 located in groove 92 in segmented ring 86. Feed fluid is prevented from leaking passed bulkhead 82 by means of seal 94 in groove 96 around the perimeter or bulkhead 82. Feed fluid holding cavity 98 slows down the velocity of the feed fluid. Feed fluid is directed by feed fluid distribution plate 100 through port 102. Distribution plate 100 is sealed to the inside surface of the pressure vessel 84 by means of seal 104 in groove 106 around the perimeter of distribution plate 100. Feed fluid is directed into the feed fluid distribution channel 108, formed by the registration of feed fluid spacer layers and membrane-permeate carrier assemblies of the stacked subassembly 110. Within stacked subassembly 110, feed fluid spacer layers 112 are alternated with membrane-permeate carrier assemblies 114. The membrane-permeate carrier assemblies 114 consist of two outward facing layers of membrane 116 sealed to the permeate carrier material 118 with peripheral adhesive line 120.

The feed fluid spacer layer 112 has a central aperture around which is formed a seal 122 with the active faces of the two layers of membrane 116 of the membrane-permeate carrier assembly 114. Registration of the layers forms the permeate collection and distribution channel 124 down the center of the stacked assembly. On the opposite side of feed fluid distribution channel 108 is the residual collection and distribution channel 126 also formed by the cut out notches and the registration of the layers in the stacked assembly. Midsection distribution plate 128 distributes the residual fluid from the first stacked subassembly 110 through port 130 into the feed fluid distribution channel 132 of the second stacked subassembly 134. A perimeter seal 136 in groove 138 prevents the residual fluid from leaking past the plate 128.

In second stacked subassembly 134 feed distribution channel 132, permeate collection channel 124 and residual channel 140 are formed as described above. In third stacked subassembly 142 residual channel 144, permeate collection channel 124 and feed distribution channel 146 are formed as described above. Residual fluid leaving the third stacked subassembly 142 is directed by distribution plate 148 through port 150 into the residual fluid cavity 152. Permeate is carried down channel 124 through port 154 in distribution plate 148. A suitable seal is formed at 156 between the feed fluid spacer layer and distribution plate 148 around port 150 to prevent the contamination or mixing of the feed fluid or residual fluid with the permeate fluid. Permeate channel 124 extends through the residual cavity 152 by means of pipe 158 sealed to distribution plate 148 and bulkhead 160 at points 162. Permeate exits the stacked assembly via port 164 in bulkhead 160 and pipe 166 which is sealed to bulkhead 160 at point 168. Residual exits the stacked assembly via port 150 in distribution plate 148 and flows into residual cavity 152 and then out of the pressure housing via port 170 through bulkhead 160 and via pipe 172 to bulkhead 160 at 174. Bulkhead 160 is held in place and sealed in a manner identical to that described for bulkhead 82.

Another midsection distribution plate 176 separates second stacked assembly 134 from third stacked assembly 142. The residual fluid from the second stacked subassembly 134 passes downwardly through port 178 into feed fluid distribution channel 146.

As can be seen in FIG. 10, each of the feed fluid spacer layers 112 in each subassembly has a perimeter sealing ring 180 which is present around the edge of the feed fluid layer except at the notches, as is explained above in regard to FIGS. 3 to 5.

For the present invention to function it is essential that a leak free seal be formed between the face or active side of the membranes 116 and the feed spacer layer 112 around the central collection channel 124 at point 117 in FIG. 11. On the feed fluid side of this seal the pressures can be quite high while on the permeate side of this seal the pressures are usually much lower. This condition would force feed fluid into the permeate cavity if the seal is not complete and intact and strong enough to withstand this pressure differential. With some types of membranes which can be used in the practice of the present invention this problem is exacerbated by the fact that the membranes in service are brittle. An example being dried cellulose acetate membrane for gas separation. Wheh sealant or adhesive is placed on the active side of the membrane a good bond can be made. However, in service the outer perimeter of this adhesive or sealant line is stressed. The active surface of the membrane is very thin and since the adhesive or sealant does not penetrate the membrane but bonds to the active surface, cracks can develop causing leaks at this adhesive line. To remedy this problem the membrane must be reinforced at this sealant line.

Referring to FIG. 12 a plan view of the back or porous side of a cellulose membrane layer 116. A low viscosity epoxy, urethane or other suitable resin is placed around the perimeter of the central collection channel 124. The resin is selected so that it penetrates into the porous substructure of the membrane and fills the membrane. The resin is compressed during curing so that after the resin is cured the impregnated area is not thicker than the surrounding non-impregnated area. This impregnation step with a suitable resin is completed after the membrane layer has been cut into the proper shape but before the membrane layer has been assembled into the membrane-permeate carrier assembly. In FIG. 12, element 182 identifies the annular ring of impregnating resin placed around central collection channel 124. Item 122 identifies the annular ring of sealant or adhesive that is placed on the active side or face of the membrane. It should be noted that the impregnating resin is wider than the bonding or sealant ring.

FIG. 13 is a cross section of the central collection channel 124 similar to the view in FIG. 11. In FIG. 13, layer 112 is the feed fluid spacer, 116 is the membrane, 118 is the permeate carrier material and 186 is the membrane-permeate carrier assembly. Item 122 is the sealant or adhesive bond formed or placed between the active or face side of the membrane 116 and the feed fluid spacer layer 112. Item 182 is the area of the resin impregnated membrane that reinforces the sealant line 122 at the interface with membrane 116. Point 188 is the area where the perpeate carrier material 118 has fluid communication with the central collection channel 124.

Figure 14:
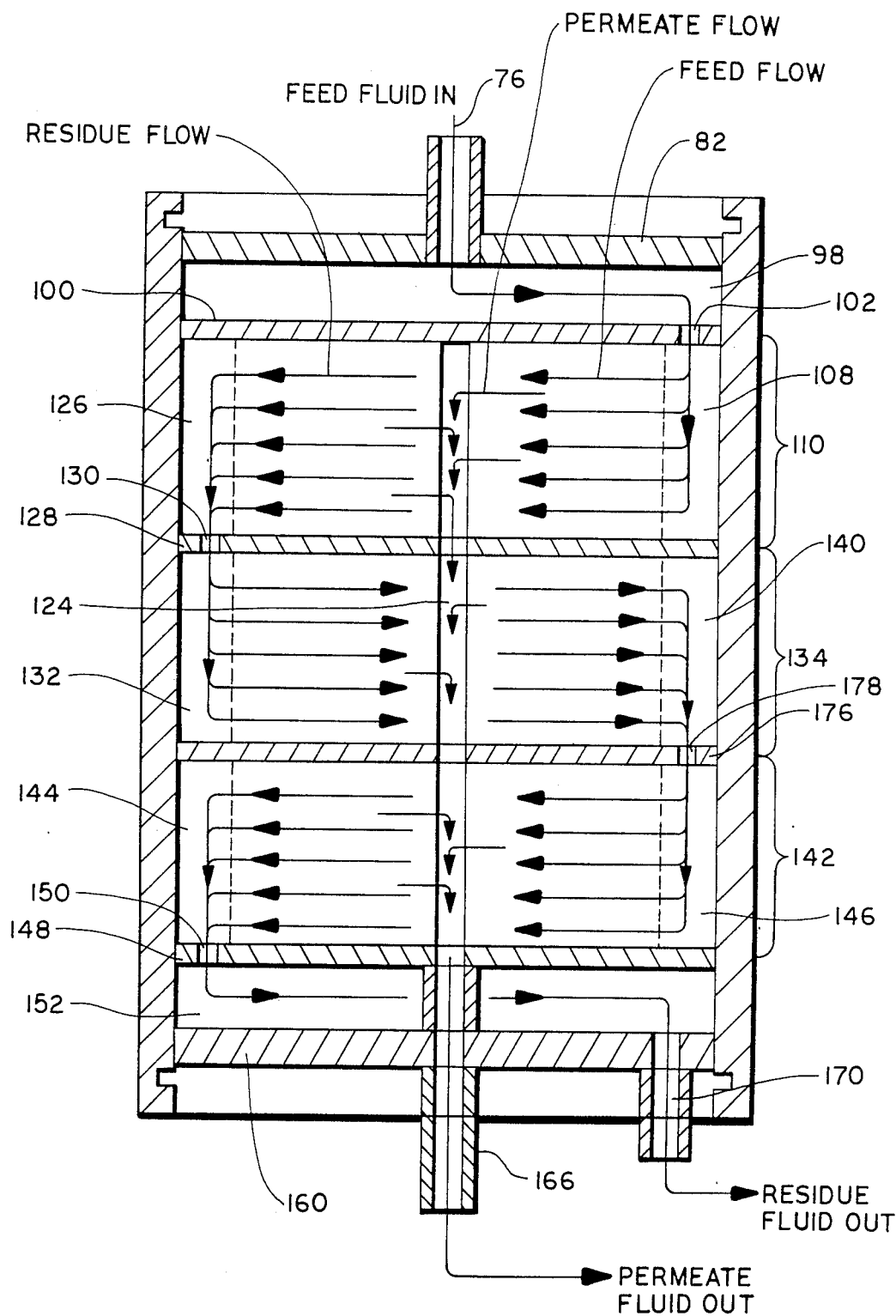
FIG. 14 is a cross section of the stacked assembly showing the path of feed, permeate and residue fluids through the assembly.

Referring to FIG. 14 a cross section of the stacked assembly showing the path of the feed fluid, the residual fluid and the permeate fluid through the assembly. In operation, the feed fluid enters feed fluid port 76 passes through bulkhead 82 and passes into feed fluid holding cavity 98. The feed fluid passes through port 102 in the feed fluid distribution plate 100 into the first stacked subassembly 110. The feed fluid spacer layers and the membrane-permeate carrier assemblies are assembled together in a manner so that the notches in each layer are in register or alignment. The alignment or registration of said layers forms two channels 108 and 126 down the sides and a channel 124 down the center of the stacked assembly. Distribution plate 100 is so positioned to place the feed fluid distribution port 102 over channel 108. It must be noted that the notches cut into each layer of material may be of various shapes and sizes. The size would most logically be determined to be as small as possible while maintaining acceptable fluid velocity rates. The size, shape and position of the notches cut into each layer would generally be identical to all other layers within a subassembly. The location of the notches may also be positioned at points other than opposed to each other. They could be positioned next to each other with only a thin wall of material separating them. In effect the separation of the notches could be as little as one radial degree and as much as 180 radial degrees. Feed fluid enters this channel 108 and is prevented from traveling downward in channel 140 by midsection distribution plate 128. Feed fluid is forced to flow into the first stacked subassembly 110 and into the feed fluid spacer layers in parallel toward channel 126 formed on the opposite side of the stacked assembly by the registration of the notches. This channel 126 becomes the residual fluid collection channel. The residual fluid from stacked subassembly 110 leaves the residual fluid collection channel 126 through port 130 in midsection distribution plate 128. This residual fluid after passing through distribution plate 128 becomes the feed fluid for the next subassembly 134 and is distributed down the feed fluid distribution channel 132 into the feed fluid spacer layers of this subassembly. As the feed fluid passes through the feed fluid spacer layers the more permeable component of the feed fluid passes through the membrane and into the permeate carrier material. The permeate flows toward the area of less pressure which is the central area of the membrane-permeate carrier assembly. The permeate enters this permeate collection channel 124 and is joined by permeate from other layers and subassemblies. The permeate flows down central channel 124 formed by the registration of the central holes in the membrane-permate carrier assemblies and the central holes in the feed fluid spacer layers and out of the assembly through the permeate outlet port 166.

The feed fluid that entered subassembly 134 through the feed fluid distribution channel 132 flows through the feed fluid spacer layers to channel 140 on the other side of the assembly. The fluid then becomes the residual fluid for this subassembly, 134, and leaves this subassembly via channel 140 and port 178 in midsection distribution plate 176. The fluid entering subassembly 142 becomes the feed fluid for this subassembly. The feed fluid passes down feed fluid distribution channel 146 and flows in parallel through the feed fluid spacer layers of this subassembly. The fluid collects in channel 144 where it becomes the residual fluid from this subassembly. The residual leaves subassembly 142 via port 150 in the residual distribution plate 148. The so directed residual fluid enters the residual cavity 152 and out of the stacked assembly via residual fluid exit port 170 in bulkhead 160.

It is understood that there may be many subassemblies formed within one stacked assembly. The number of subassemblies is determined by the amount of the more permeable component of the feed fluid that is to be removed by the membrane. In effect, the more subassemblies are built into the stacked assembly the longer the path length the feed fluid remains in contact with the membrane and the higher the recovery or removal of the more permeable component of the feed fluid mixture. The number of feed fluid spacer layers and the number of membrane-permeate carrier assemblies contained in each subassembly is determined by the optimum feed fluid velocity through the feed fluid spacer layers. For a given feed fluid volume entering the feed fluid distribution channel the feed fluid velocity through a single feed fluid spacer layer is determined by the number of feed fluid spacer layers present in the subassembly. The greater the number of feed fluid spacer layers configured in parallel the lower the feed fluid velocity through a single layer. An advantage of the instant invention over existing art is that it is possible to configure a single pressure vessel to give virtually any recovery level desired. This is not possible to do in membrane assemblies using hollow fine fibers or spiral wound elements.

Referring again to FIG. 14, there is a differential pressure formed across the stacked assembly between the feed fluid holding cavity 98 and the residual cavity 152. This pressure differential is so formed because of the friction and consequent pressure drop of the fluid flowing through the feed spacer layers. The embodiment of the present invention described above utilizes this pressure differential between cavity 98 and cavity 152 to compress the stacked assembly. Residual distribution plate 148 is fixed in place and cannot move. Feed distribution plate 100 and all midsection distribution plates are free floating and can move downward toward the residual distribution plate putting compressive force on the layers of the stacked assembly. This is helpful in forming leak free seals between the outward facing surface of the membrane and the feed fluid spacer layers around the central aperture. In fact, it is possible with some membrane and feed fluid spacer combinations to form a dynamic seal at this point.

Figure 15:
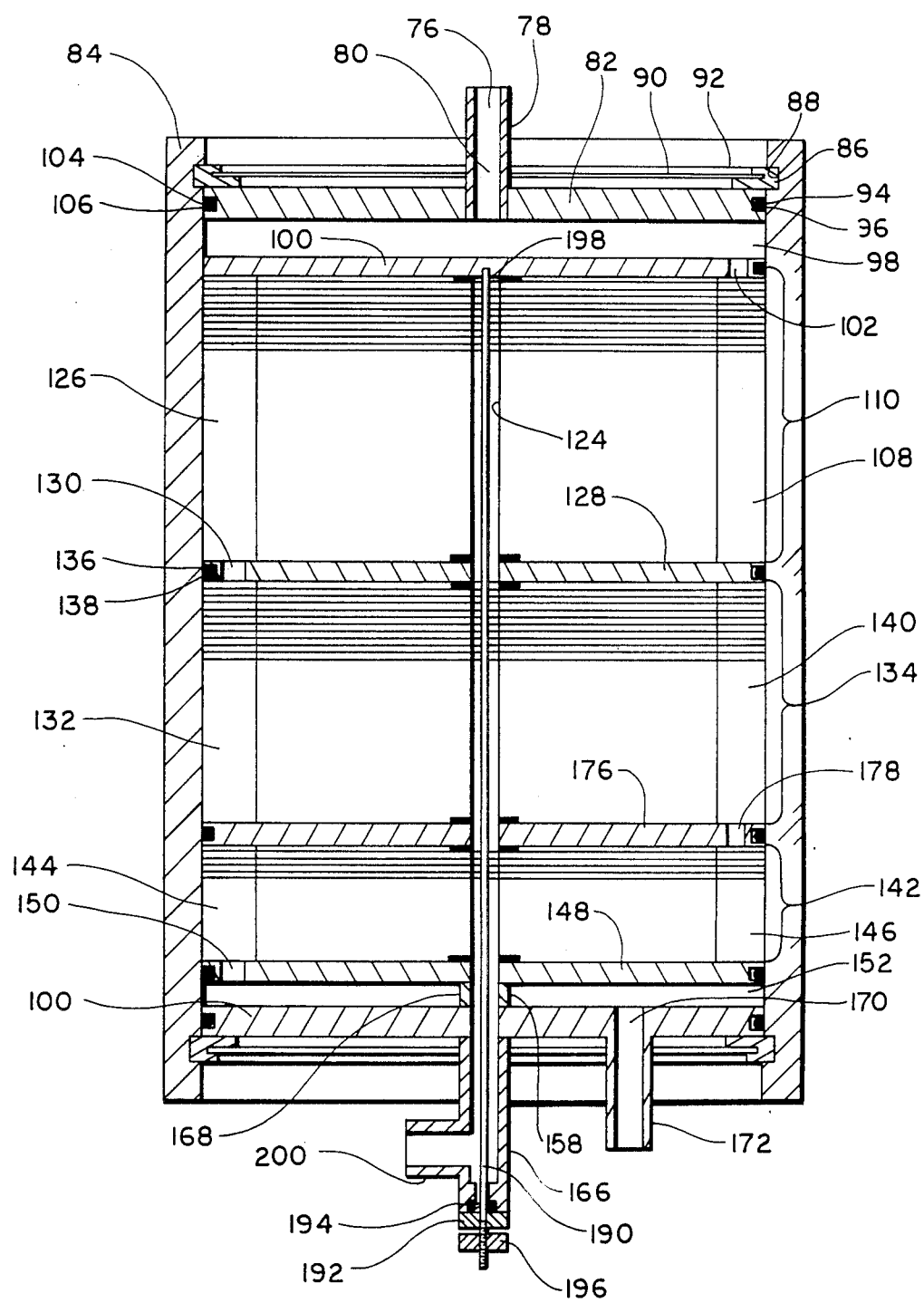
FIG. 15 is a cross section of the stacked assembly utilizing a drawbar arrangement.

FIG. 15 is a cross sectional drawing of an alternate embodiment of the instant invention. In this Figure the pressure vessel and stacked assembly inside the vessel are identical with that shown in FIG. 9 except for the presence of a drawbar 190 down the center channel and drawbar tightening apparatus. Drawbar 190 exits the vessel assembly through permeate outlet port 166 and passes through seal gland 192 and and seal 194 to tightening nut 196. Drawbar 190 is threaded on the end so that when nut 196 is tightened drawbar 190 is pulled out of the vessel. The other end of drawbar 190 is screwed into feed distribution plate 100 at 198. When the drawbar is pulled out of the vessel assembly the effect is to put compressive force on the stacked assembly. This compressive force may be needed to prevent the feed fluid from leaking past the feed fluid seal formed around the central aperture in the membrane-permeate carrier assembly. The compressive force exerted on the stacked assembly by the drawbar being pulled out of the vessel assembly is in addition to the compressive force exerted by the pressure differential between cavities 98 and 152. Permeate fluid exits the stacked assembly via a tee connection 200.

It is understood that there are many methods to form a seal around drawbar 190 and to pull drawbar 190 out of the pressure vessel assembly and that those methods would become apparent to those skilled in the art. Such methods are intended to fall within the scope of the appended claims.

Figure 16:
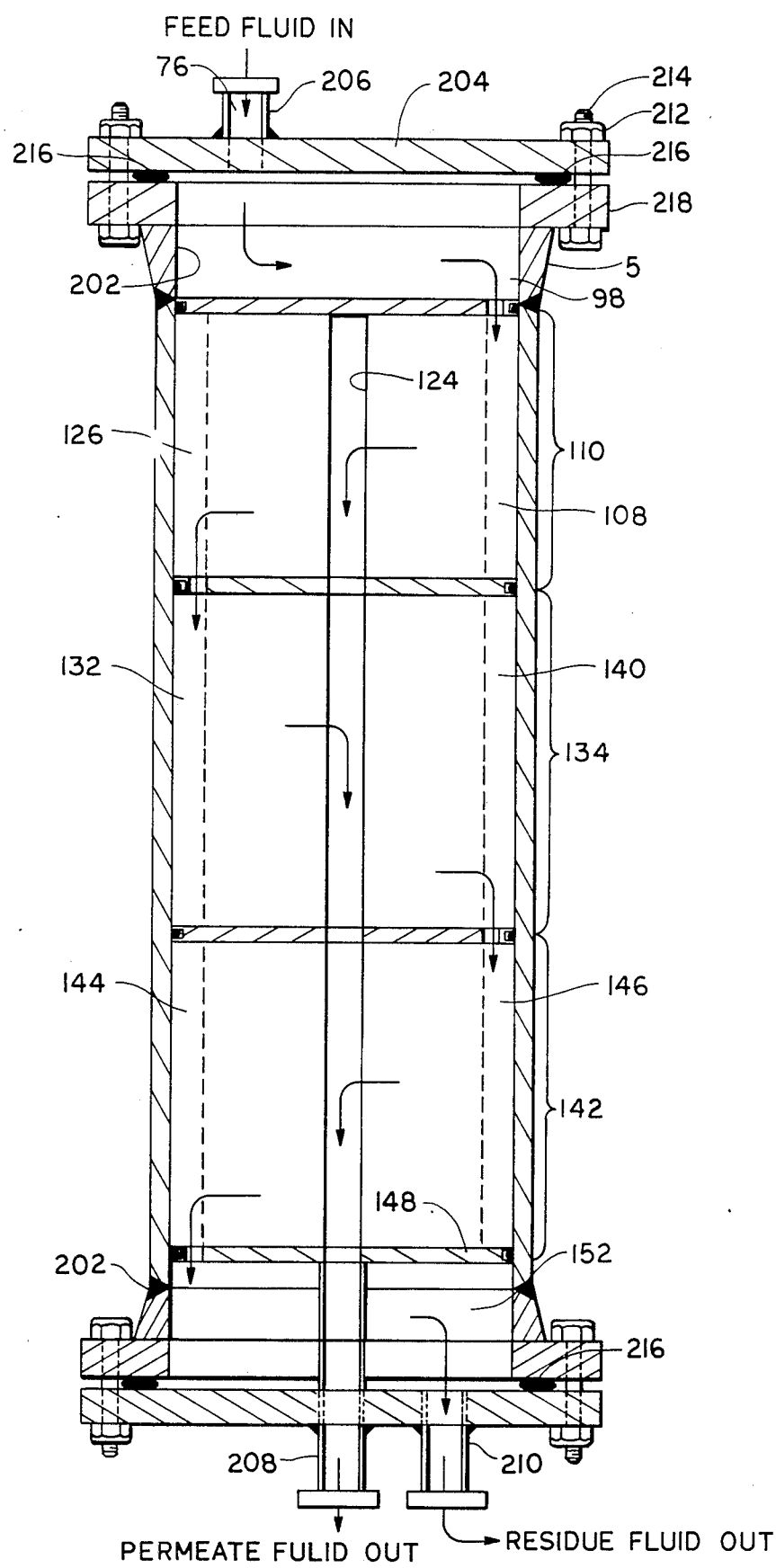
FIG. 16 is a cross section of the stacked assembly utilizing standard pipe and weld on flanges for the containment vessel.
Figure 17:
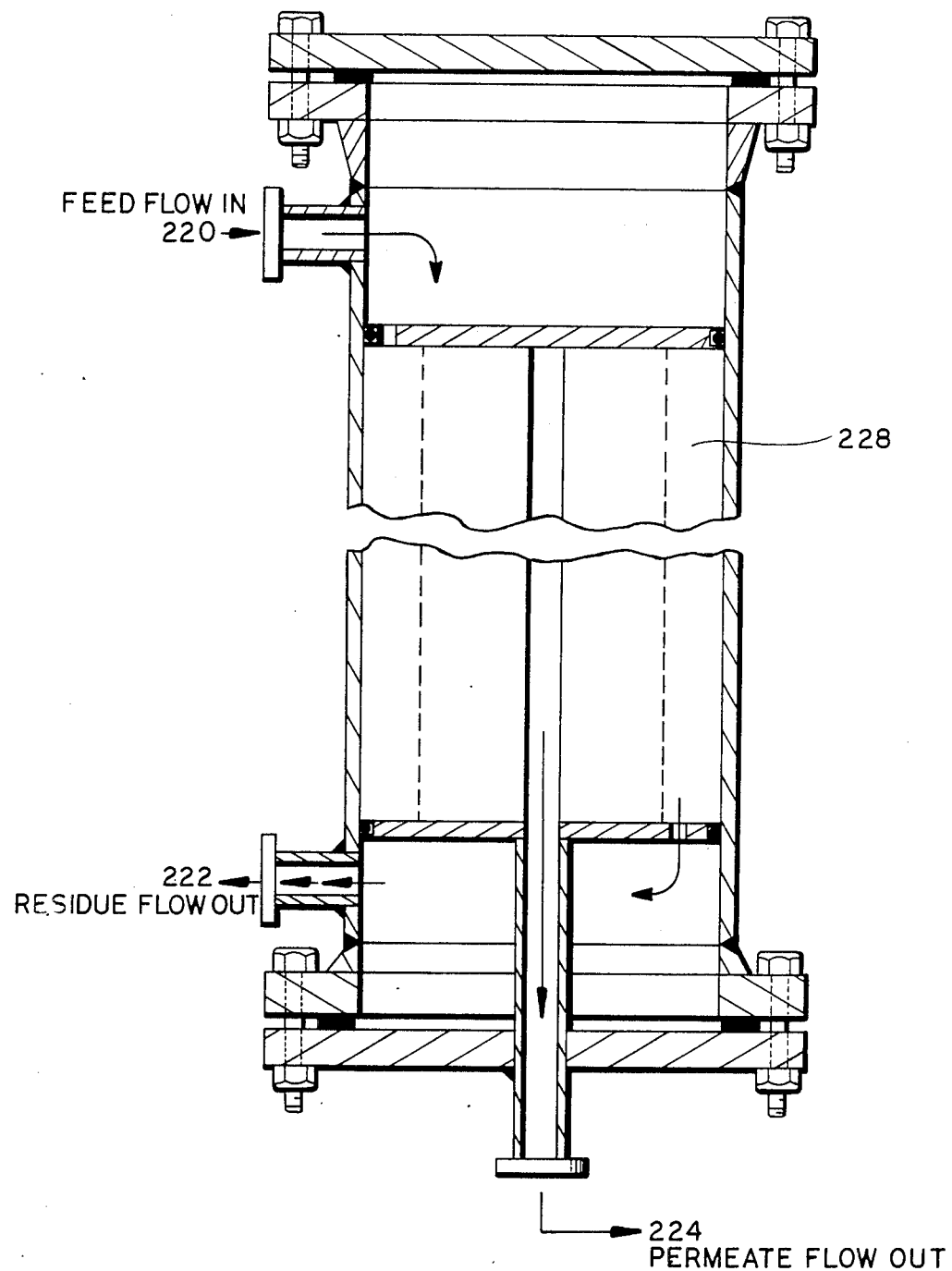
FIG. 17 is an alternate configuration of introducing the feed fluid into the vessel and removing the residual fluid from the vessel.
Figure 18:
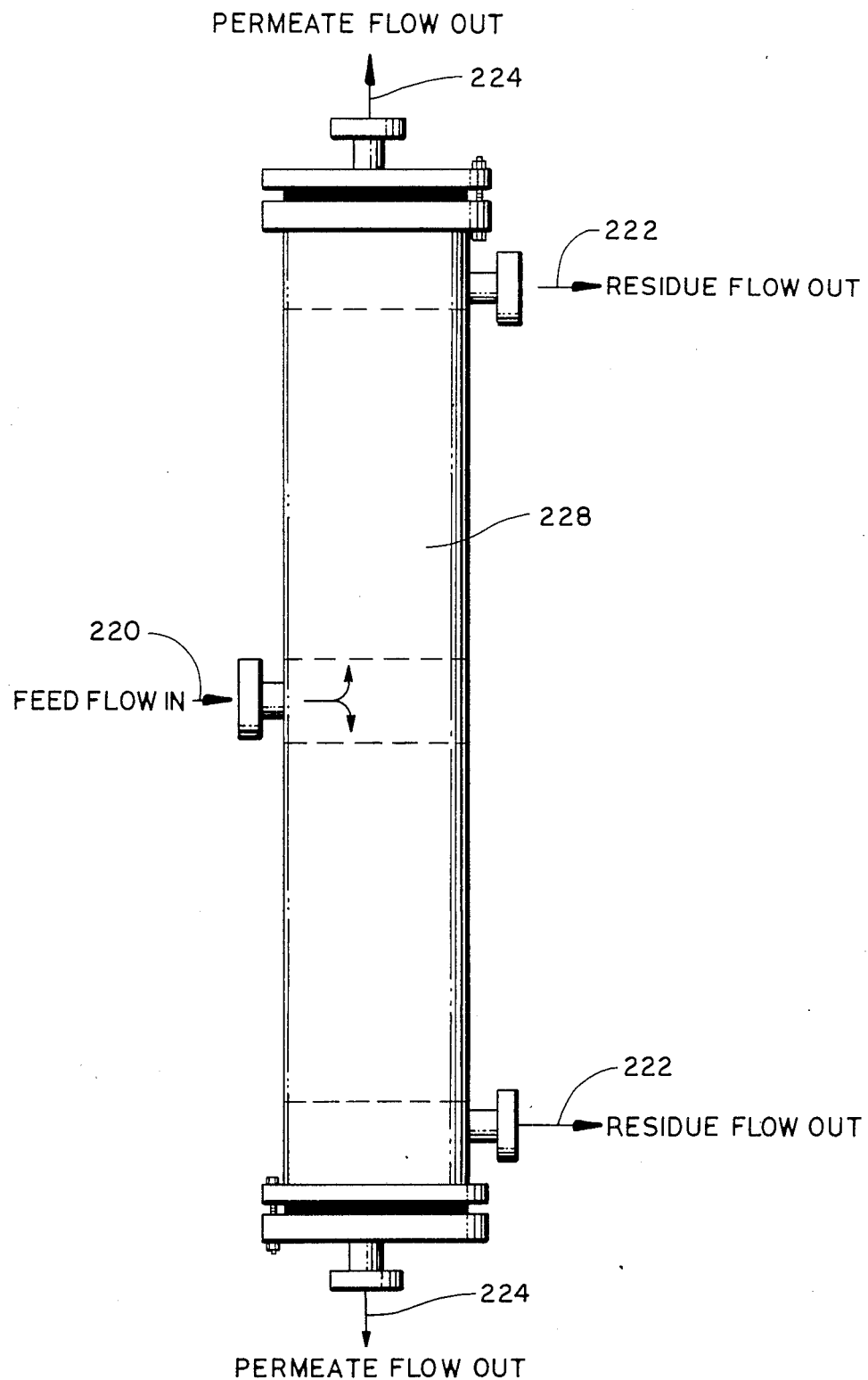
FIG. 18 is another configuration for introducing the feed and removing the residual.

FIGS. 16, 17 and 18 are modifications of the instant invention. In FIG. 16 the pressure vessel is closed by pipe flanges Standard weld-on flanges 218 are welded to the pipe of the pressure vessel and the internal welds are ground smooth at 202. A blind flange 204 is ported at 206 on the feed inlet end and at 208 and 210 on the residual end. Flange 204 is held by the nut 212 and bolt 214 assembly. Gasket 216 is positioned between blind flange 204 and weld on flange 218. All other parts of the stacked assembly are as described in FIGS. 9, 14 and 15

FIG. 17 is a cross section of a modification of the pressure vessel shown in FIG. 16. In FIG. 17 the feed inlet port 220 is through the side of the vessel. The residual port 222 could also be similarly placed. Permeate out port 224 is as depicted in FIG. 16. Stacked assembly is item 228.

FIG. 18 is a modification of the vessel arrangement shown in FIG. 17 where the feed fluid enters the pressure vessel assembly in the center of the vessel and the residual and permeate fluids are taken out of each end of the vessel.

It is understood that there are many methods to close the pressure vessel of the present invention and would become apparent to those skilled in the art. Such methods are intended to fall within the scope of the appended claims.

DESCRIPTION OF A SECOND EMBODIMENT

Figure 19:
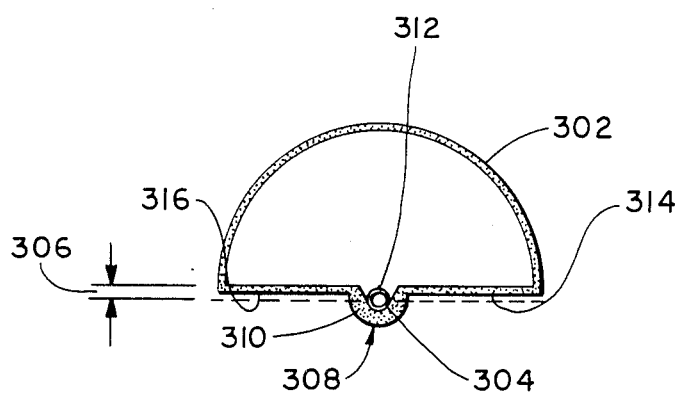
FIG. 19 is a plan view of the membrane-carrier assembly of the second specific embodiment of the invention.

In the embodiment described in FIGS. 1 through 18 the membrane and associated materials are of a circular shape. A second embodiment uses membrane and associated materials in a semicircular shape. FIG. 19 is a plan view of the membrane-carrier assembly 300 showing the semicircular shape. Perimeter adhesive line 302 is continuous around the perimeter of the assembly 300. As noted a dashed line is drawn through the center line of the central permeate collection channel 304 parallel to the line of the cut through the assembly 300. The distance of the space from the center line to the edge of the assembly is given as distance 306. A tab 308 protrudes from the side of the assembly 300 to form and enclose the permeate collection channel 304. Perimeter adhesive is placed as shown by item 310 of FIG. 19. The perimeter adhesive line is absent from area 312 thus providing a communication channel from the main area of the assembly 300 to the central permeate collection channel 304. Two areas 314 and 316 are shown. The purpose of these areas is discussed hereinbelow.

Figure 20:
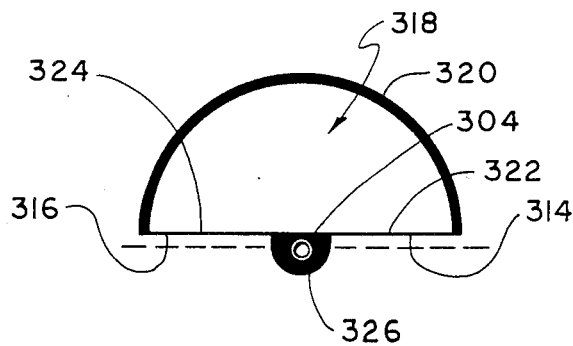
FIG. 20 is a plan view of the fluid feed spacer layer of the second specific embodiment.

FIG. 20 is a plan view of the feed fluid spacer layer 318 for this second embodiment. Item 320 of this Figure is the perimeter seal ring around the perimeter of the feed fluid spacer layer 318 except in areas 322 and 324 where the perimeter sealing ring is absent. The seal is present in area 326 around the perimeter of the central permeate collection channel 304. The shape and area of the feed fluid spacer layer is the same as the membrane-carrier assembly 300. This configuration of the feed fluid spacer layer 318 has no feed fluid distribution lines.

Figure 21:
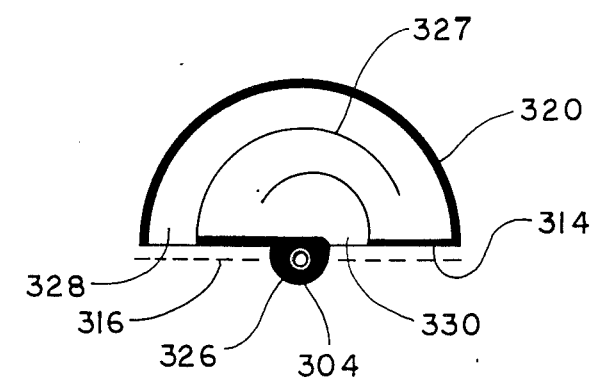
FIG. 21 is a plan view of an alternate form of the fluid feed spacer layer of the second specific embodiment.

FIG. 21 is a plan view of an alternate form of the feed fluid spacer layer for this embodiment showing feed fluid distribution lines 327. Perimeter sealing ring 320 is absent from areas 328 and 330 but present at area 326. In operation feed fluid enters the feed fluid spacer layer at point 328 and travels to exit from the feed fluid spacer at point 330, the feed fluid could also enter at point 330 and travel to and exit from point 328. In both cases being directed by feed fluid distribution lines 327. It must be noted that many different configurations of feed fluid distribution lines may be employed. It is desirable to arrange the feed fluid distribution pattern to the feed fluid being processed. Such configurations would take into effect feed fluid composition, viscosity, velocity, temperature and any other factors that are important.

Figure 22:
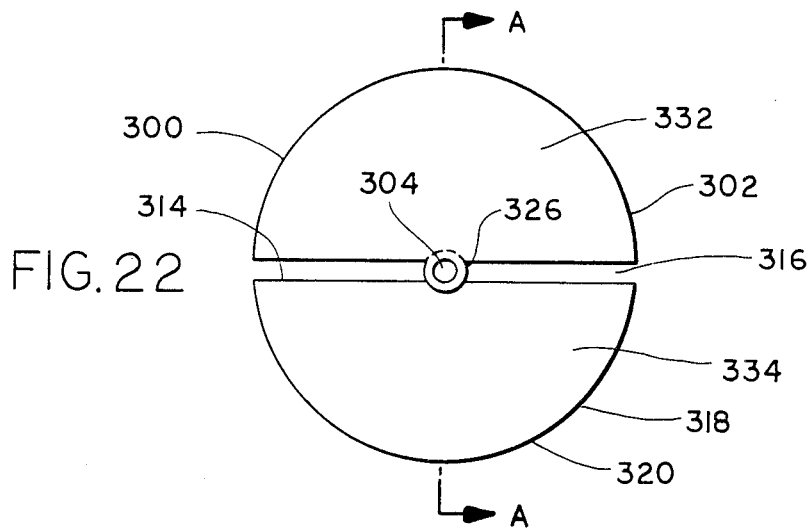
FIG. 22 is a plan view of the membrane-carrier assembly of FIG. 19 in registration with the fluid feed spacer layer of FIG. 20.

FIG. 22 is a plan view of a membrane-carrier assembly 300 placed in registration with a feed fluid spacer layer 318. When the two layers are placed in such a registration it can be seen that two channels are formed 314 and 316. A central permeate collection channel 304 is also formed. Area 332 is the active area of the membrane portion of the membrane-carrier assembly 300 and item 334 is the area of the feed fluid spacer layer 318.

Figure 23:
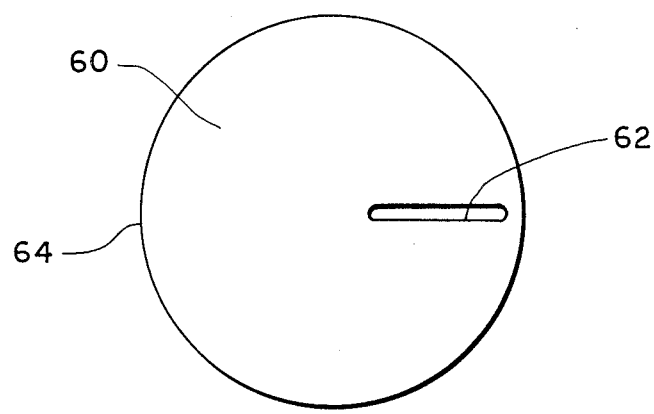
FIG. 23 shows the feed fluid inlet distribution plate of the second specific embodiment.

FIG. 23 is a plan view of the feed fluid inlet distribution plate which is generally similar to FIG. 6.

Figure 24:
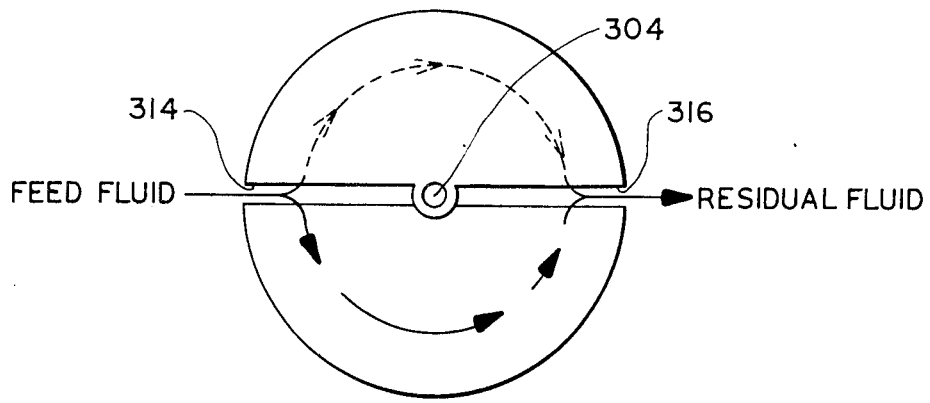
FIG. 24 is as shown in FIG. 22 with the general direction of fluid flow being indicated.

FIG. 24 is a plan view of the membrane-permeate carrier assemblies 300 in registration with feed fluid spacer layers 318. Feed fluid is shown entering feed fluid distribution channel 314 and being distributed through the feed fluid spacer layers 318 to residual distribution channel 316. Permeate entering the permeate carrier material travels to the central permeate collection channel 304 which is formed by the registration of a plurality of the feed fluid spacer layers 318 and membrane-carrier assemblies 300. FIG. 24 differs from FIG. 22 in showing the general direction of the fluid flow. The operation of the device is further shown by FIG. 25 to which we now turn.

Figure 25:
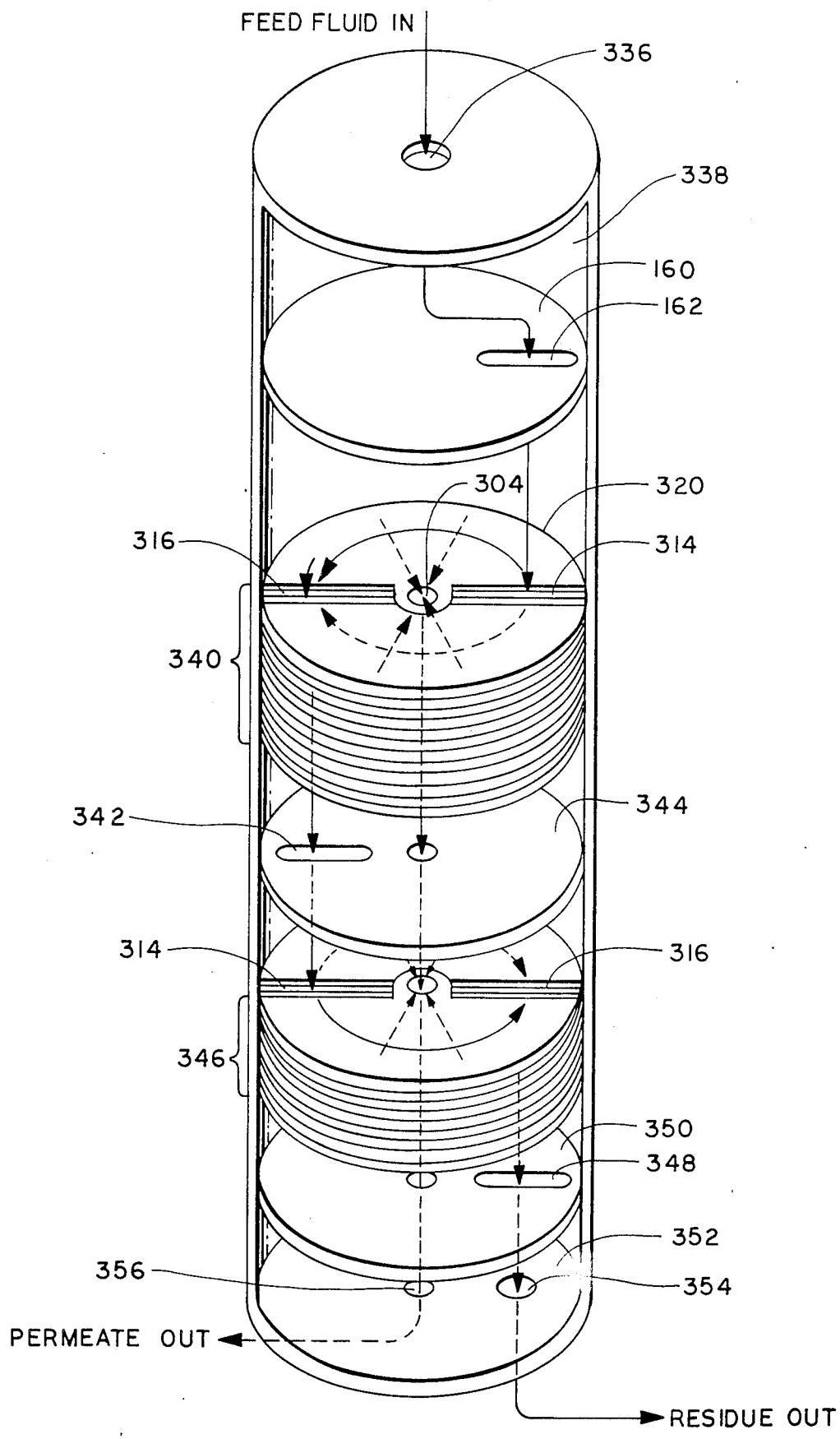
FIG. 25 depicts the operation of the second specific embodiment.

FIG. 25 depicts the operation of the semicircular embodiment of the present invention. In many respects, the structure of FIG. 25 parallels that of FIGS. 9 and 14. Feed fluid enters the vessel at point 336 into feed cavity 338 and passes through feed fluid distribution port 162 in distribution plate 160. The feed fluid enters subassembly 340 and into the feed fluid distribution channel 314 and travels through the feed fluid spacer layers 318 to channel 316. This is the residual collection channel for this subassembly 340. The fluid flows through port 342 in distribution plate 344. The component of the feed fluid that permeates the membrane travels across the surface of the membrane into the permeate carrier material and into the permeate collection channel 304. Perimeter sealing bead or ring 320 on feed fluid spacer layers 318 forms a seal to the inside wall of the vessel to prevent feed fluid from bypassing subassemblies 340 and 346. The feed fluid entering second subassembly 346 is distributed through the feed fluid spacer layers in parallel toward the residual collection channel 316. The residual fluid collects in channel 316 and passes out of this second subassembly via port 348 in distribution plate 350. The residual fluid then enters the residual fluid cavity 352 and then exits the assembly via port 354. The permeate exits the assembly via port 356. This FIG. 25 depicts a stacked assembly utilizing feed fluid spacer layers as shown in FIG. 20. These feed fluid spacer layers are devoid of feed fluid distribution lines. If feed fluid spacer layers of the type depicted in FIG. 21 had been shown, the fluid distribution through these layers would have been different.

It will be understood that subassemblies 340 and 346 are each a stack of units of the type depicted in FIGS. 22 and 24 and there may be many such subassemblies per vessel. It is also understood that the pressure vessel hardware has been omitted from this drawing for clarity.

DESCRIPTION OF A THIRD EMBODIMENT

Figure 26:
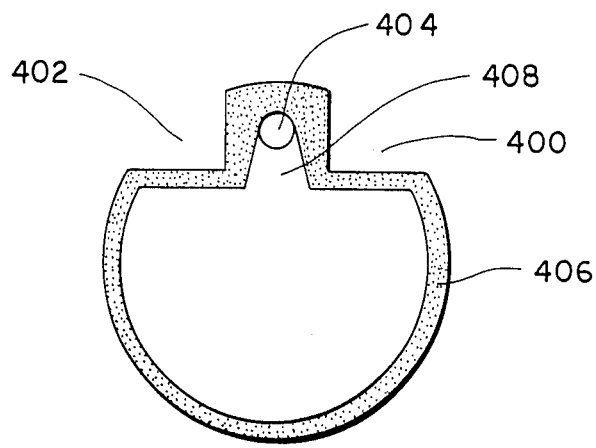
FIG. 26 is a plan view of the membrane-carrier assembly of the third specific embodiment of the invention.

An alternate configuration of the present invention is shown in FIG. 26, a plan view of a membrane-permeate carrier assembly. The membrane-permeate carrier assembly is shown as a circular shape with the notches 400 and 402 placed on either side of the non-central permeate collection channel 404. In cross section this assembly would be identical with that described in FIG. 2. The perimeter adhesive line 406 is absent in area 408 of FIG. 26 to allow for the communication of the permeate carrier material and the non-central permeate collection channel 404.

Figure 27:
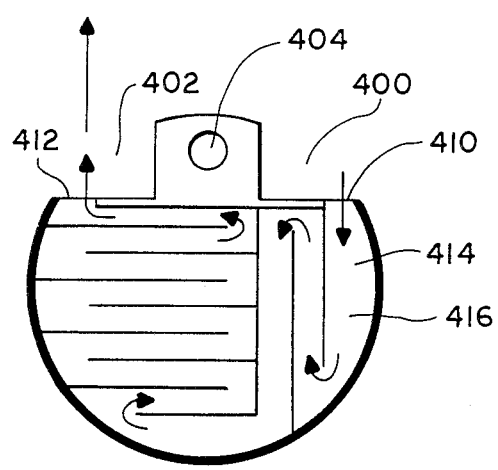
FIG. 27 is a plan view of the fluid feed spacer layer of the third specific embodiment.

FIG. 27 is a plan view of a feed fluid spacer layer showing a possible feed fluid distribution pattern. Feed enters at 410 and exits at 412. The distribution lines are indicated as 414 and the spaces between as 416.

When membrane-permeate carrier assemblies are interposed between feed fluid spacer layers and are placed in registration the feed fluid and residual fluid collection and distribution channel are formed by the notches 400 and 402. The permeate collection channel 404 is also so formed.

Figure 28:
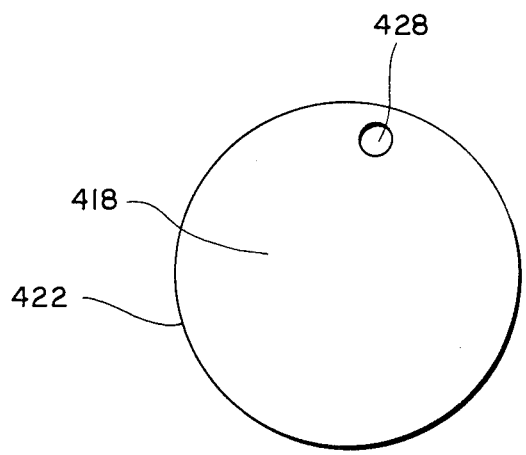
FIG. 28 is a plan view of the feed fluid distribution plate of the third specific embodiment.

FIG. 28 is a plan view of the feed fluid distribution plate 418 showing the port 428 and perimeter seal 422.

Figure 29:
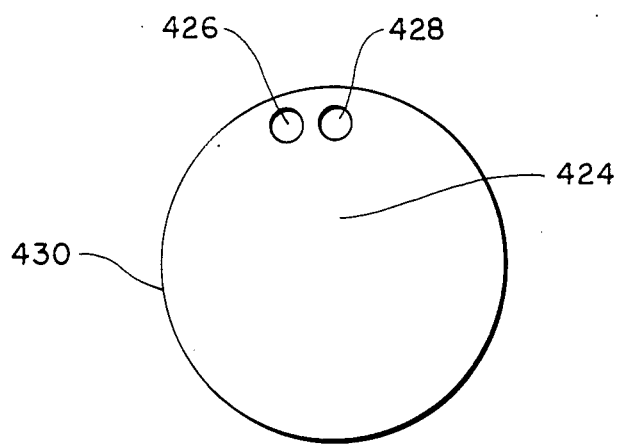
FIG. 29 is a plan view of the midsection and residual fluid distribution plates of the third specific embodiment of the invention.

FIG. 29 is a plan view of the midsection and residual fluid distribution plates 424 showing the port 426 for feed fluid and residual fluid and port 428 for permeate fluid. Element 430 is the perimeter seal. It is to be understood that notches 400 and 402 could be located at other points.

In operation the embodiment would operate in a manner as described in FIGS. 9 and 14. The difference being that the permeate is collected in a non-central channel.

DESCRIPTION OF A FOURTH EMBODIMENT

Figure 30:
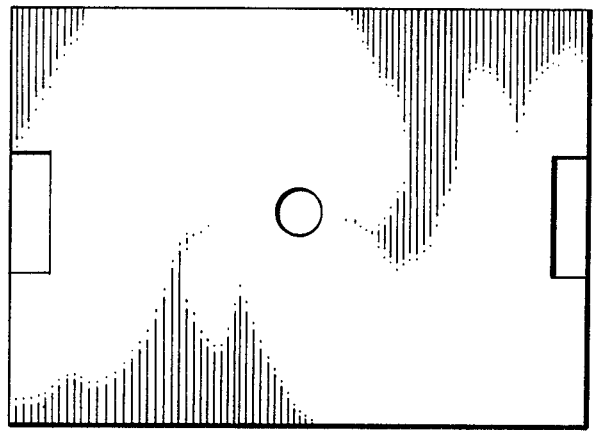
FIG. 30 shows the membrane-permeate carrier assembly of the fourth specific embodiment of the invention.
Figure 31:
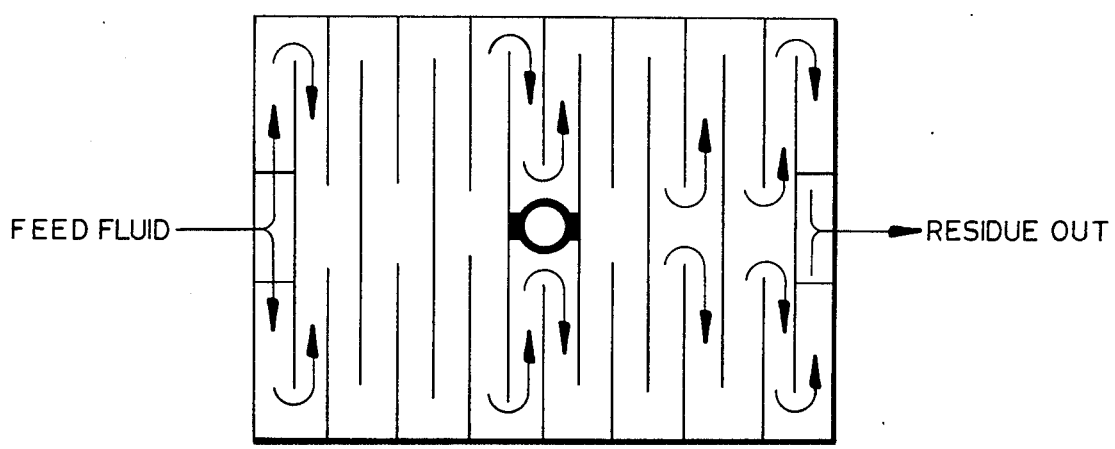
FIG. 31 shows the feed fluid spacer layer of the fourth specific embodiment of the invention.

FIGS. 30 and 31 show an alternate configuration of the present invention. Here the shape of the various components are square or rectangular instead of circular. FIG. 30 shows the membrane-permeate carrier assembly. FIG. 31 shows the feed fluid spacer layer. Generally, the arrangement is the same as described in FIGS. 1 through 13. In operation the stacked assembly would be inserted into a square or rectangular vessel and operation would be identical with that described in FIGS. 9 and 14.

DESCRIPTION OF A FIFTH EMBODIMENT

Previously described embodiments of the instant invention have shown the various layers of the stacked assembly inserted directly into the pressure vessel. Each feed fluid layer forms a seal between itself and the interior of the pressure vessel to prevent the feed fluid from by-passing the membrane layers. A further embodiment of the present invention presents a modular approach to placing the stacked assembly into the pressure vessel. In this embodiment, the stacked assembly is modular in construction making it possible for the stacked assembly to be installed and removed from the pressure vessel as a unit or module, rather than as individual layers or groups of layers.

Figure 32:
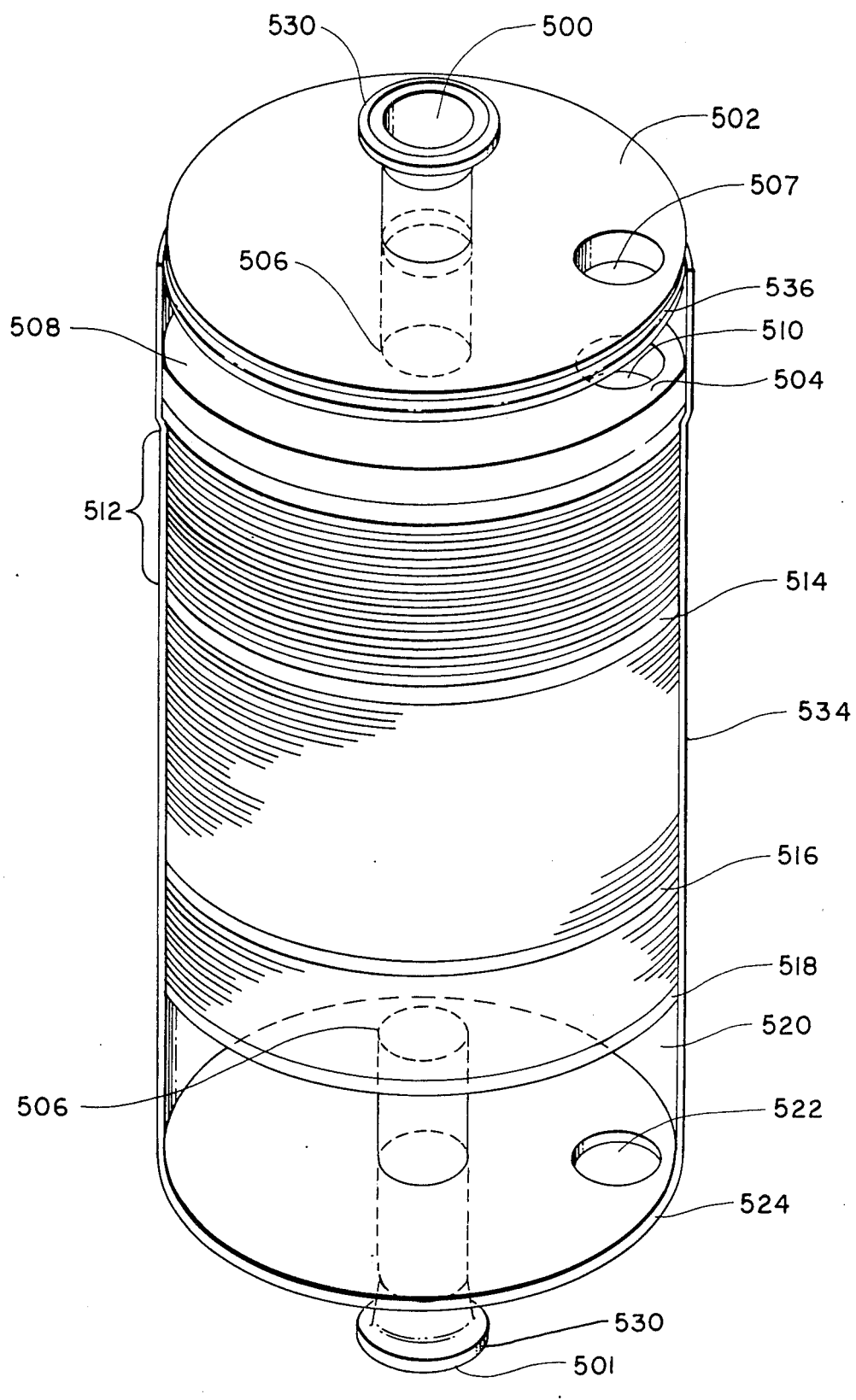
FIG. 32 shows a view of the stacked assembly of the fifth specific embodiment of the invention.

FIG. 32 shows a view of a circular version of the stacked assembly (as described in FIG. 9) in a modular configuration. The permeate tube 500 is passed through top plate 502 and sealed into plate 504 at point 506. Feed fluid port 507 through top plate 502 passes feed fluid into holding cavity 508. The feed fluid passes into the stacked assembly through port 510 in plate 504. The layers of the stacked assembly in area 512 are identical fo those described in FIGS. 9 and 25. Mid-section distribution plates 514 and 516 are shown. A residual distribution plate is shown as item 518. Residual fluid leaves the residual cavity 520 by means of port 522 in bottom plate 524. Permeate fluid can leave the module by either end of the permeate tube at 501 or 500. On each end of the module, the permeate tube has a means of connection with another module or to the permeate exit pipe. This connection may be by means of a flange and O-ring or gasket arrangement or by means of threaded connections, such as a union. Shown at 530 is a flange arrangement utilizing a gasket and clamp arrangement.

When the module is assembled with all of the required layers in registration and the distribution and top and bottom plates in place the device is overwrapped with a suitable material to provide a fluid barrier and mechanical strength. The outer wrap 534 may be of an elastomer or of fiber reinforced plastic. To force feed fluid to enter the module a seal 536 is installed in a suitable groove in top plate 502. This seal touches the interior wall of the pressure vessel forming a barrier to the feed fluid.

Alternatively, the stacked assembly can be enclosed in a thin-walled vessel or pipe of metal or plastic. The top and bottom plates can be bonded to the vessel or pipe at each end.

It is understood that this modular embodiment of the present invention can utilize the semicircular or the non-central permeate collection embodiments.

Figure 33:
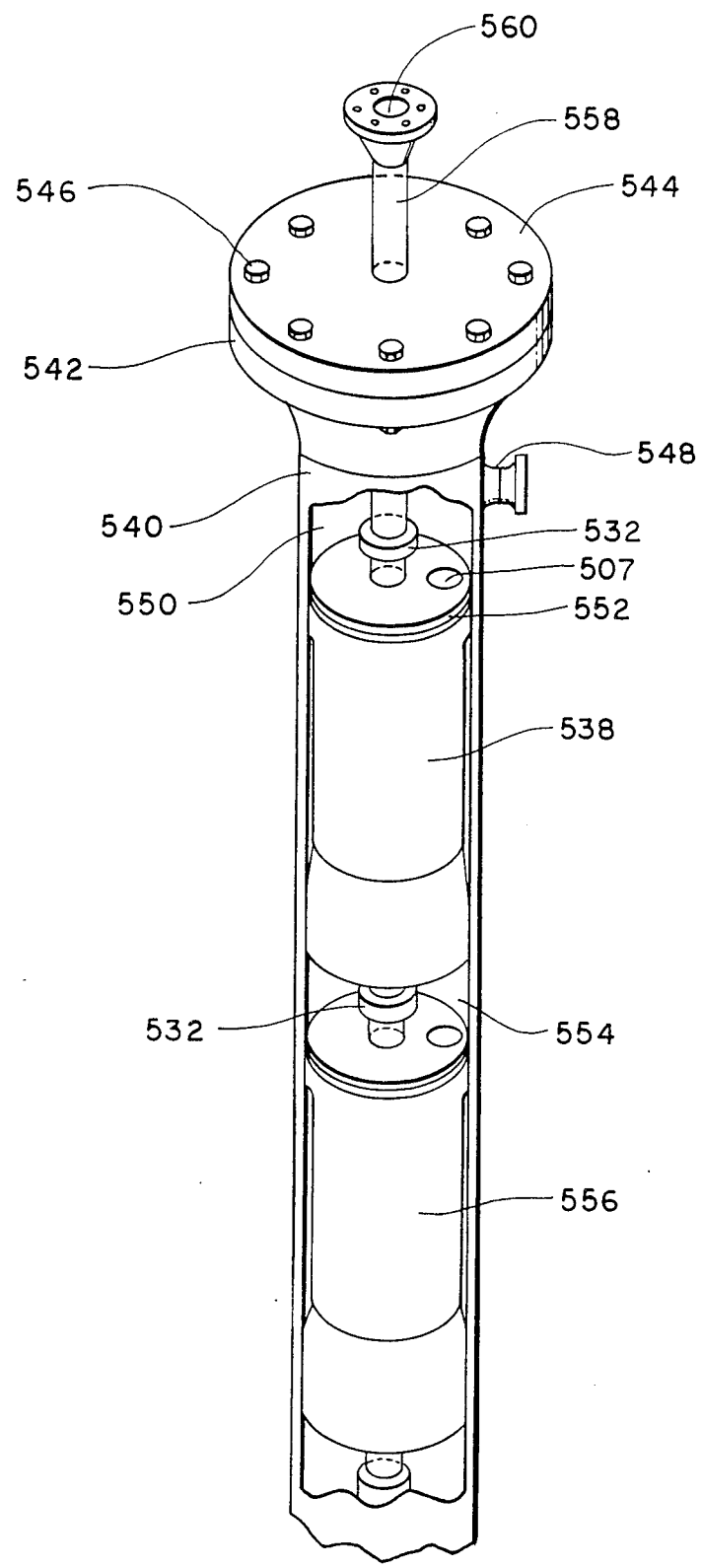
FIG. 33 shows an assembly of several modules of the fifth specific embodiment of the invention.

FIG. 33 shows an assembly of several of the modules of FIG. 32 in a pressure vessel. Module 538 is situated inside pressure vessel 540 with end flange 542 welded onto vessel 540 and end cap 544 held in place with bolts 546. Feed fluid enters vessel through port 548 and enters cavity 550 and passes into the stacked assembly module 518 via port 507. Feed fluid is prevented from by-passing the module by feed seal 552. The residual fluid leaves the first module and enters cavity 554 where it becomes the feed for the next module 556. Modules are connected together and to the permeate outlet pipe 558 by connection 532. This permeate is recovered via line 558 and 560. It is understood that the modules of the present invention can be inserted into any suitable pressure containment vessel. The advantage of this embodiment of the present invention is that it is easy to install and replace membrane modules in the pressure vessel in the field.

Having fully described the invention, it is intended that it be limited only by the lawful scope of the appended claims.

We claim:

1. A device for the separation of two or more different materials comprising:

a pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of elements disposed in superposed relationship, said elements including separator membranes, distribution zones for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

2. The device of claim 1 wherein each assembly has two side-by-side stacks of elements, each stack being configured to form said notches between them, the two stacks being in common registry at said central aperture.

3. The device of claim 1 wherein the feed fluid is admitted to the pressure vessel midway along its length and the residue and permeate are removed at each end of the vessel.

4. The device of claim 1 wherein said membranes are reinforced adjacent to said internal apertures.

5. The device of claim 1 wherein said distribution zone is sealed against fluid communication with said permeate collection channel.

6. The device of claim 1 wherein said membranes and permeate carrier elements are sealed around their edges to prevent the incursion of feed material.

7. The device of claim 1 wherein an array of said stacked assemblies are vertically disposed within said pressure vessel, the residue from one assembly providing the feed fluid to the next stacked assembly.

8. A device for the separation of two or more different materials comprising:

an elongated cylindrical pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of elements disposed in superposed relationship, said elements including separator membranes, distribution zones for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

9. The device of claim 1 wherein said membrane is an ultra-filtration membrane.

10. The device of claim 1 wherein said membrane is a reverse osmosis membrane.

11. A device for the separation of two or more different materials comprising:

an elongated cylindrical pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of elements disposed in superposed relationship, said elements including separator membranes, distribution elements for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

12. The device of claim 11 wherein said distribution elements are edge sealed against incursion of feed fluid except at said notches.

13. The device of claim 11 wherein said distribution elements contain feed fluid distribution lines.

14. The device of claim 11 wherein said membrane is a gas separation membrane.

15. The device of claim 11 wherein said permeate carrier element is a woven or knitted material.

16. The device of claim 11 wherein said permeate carrier element is a woven or knitted material reinforced with a plastic resin.

17. A device for the separation of two or more different materials comprising:

an elongated cylindrical pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of flat, disc-like elements disposed in superposed relationship, said elements including separator membranes, distribution elements for providing lateral flow of feed fluids to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

18. A device for the separation of two or more different materials comprising:

an elongated rectangular pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of elements disposed in superposed relationship, said elements including separator membranes, distribution elements for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

19. A device for the separation of two or more different materials comprising:

an elongated rectangular pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of flat, rectangular elements disposed in superposed relationship, said elements including separator membranes, distribution elements for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered internal apertures forming a permeate collection channel which is in fluid communication with said permeate carrier elements, said stacked assembly being disposed between said means for admitting and said means for removing.

20. A device for the separation of two or more differnet materials comprising:

an elongated cylindrical pressure vessel adapged to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of flat, disc-like elements disposed in superposed relationship, said elements including separator membranes, distribution elements for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches at two spaced-apart points, one of said registered edge notches forming a feed channel for feed fluid to be separated and the other of said registered edge notches forming a residue collection channel, said distribution zone being in fluid communication with said feed and residue collection channels at said registered notches, and said elements also having registered central apertures forming a permeate collection channel which is in fluid communication with said permeate carrier elements, said stacked assembly being disposed between said means for admitting and said means for removing.

21. The device of claim 20 wherein said membranes are reinforced adjacent to said central apertures.

22. A device for the separation of two or more different materials comprising:

an elongated cylindrical pressure vessel adapted to contain fluids under pressure, means for admitting feed fluid to be separated to said vessel, means for removing residue from said vessel, means for removing permeate from said vessel, at least one compact stacked assembly within said vessel adapted to be pre-tested and comprising a plurality of flat, disc-like elements disposed in superposed relationship, said elements including separator membranes, distribution elements for providing lateral flow of feed fluid to be separated across the active faces of said membranes, and permeate carrier elements abutting the opposed faces of the membranes to carry away permeate, means for providing a wide range of sizes and for precluding misalignment which includes said elements in said stacked assembly having registered edge notches which are diametrically opposed, one of said registered edge notches forming a feed channel for feed fluid to be separated and the other of said registered edge notches forming a residue collection channel, said distribution zone being in fluid communication with said feed and residue collection channels at said registered notches, and said elements also having registered central apertures forming a permeate collection channel which is in fluid communication with said permeate carrier elements, said stacked assembly being disposed between said means for admitting and said means for removing.

* * * * *